(12) United States Patent
Amano

(10) Patent No.: US 9,199,542 B2
(45) Date of Patent: Dec. 1, 2015

(54) VEHICLE AND METHOD OF CONTROLLING VEHICLE

(75) Inventor: Takashi Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 60 days.

(21) Appl. No.: 14/347,036

(22) PCT Filed: Sep. 27, 2011

(86) PCT No.: PCT/JP2011/071976
§ 371 (c)(1),
(2), (4) Date: Mar. 25, 2014

(87) PCT Pub. No.: WO2013/046311
PCT Pub. Date: Apr. 4, 2013

(65) Prior Publication Data
US 2015/0021916 A1    Jan. 22, 2015

(51) Int. Cl.
| | | |
|---|---|---|
| B60L 9/00 | (2006.01) |
| B60L 11/14 | (2006.01) |
| B60K 6/445 | (2007.10) |
| B60W 10/06 | (2006.01) |
| B60W 10/08 | (2006.01) |
| B60W 20/00 | (2006.01) |
| B60L 15/20 | (2006.01) |
| B60L 11/02 | (2006.01) |
| B60L 11/18 | (2006.01) |
| B60W 30/18 | (2012.01) |

(52) U.S. Cl.
CPC ............... B60L 11/14 (2013.01); B60K 6/445 (2013.01); B60L 11/02 (2013.01); B60L 11/18 (2013.01); B60L 11/1809 (2013.01); B60L 15/2045 (2013.01); B60W 10/06 (2013.01); B60W 10/08 (2013.01); B60W 20/00 (2013.01); *B60L 2240/12* (2013.01); *B60L 2260/26* (2013.01); *B60W 2030/1809* (2013.01); *B60W 2710/083* (2013.01); *Y02T 10/6239* (2013.01); *Y02T 10/7283* (2013.01)

(58) Field of Classification Search
None
See application file for complete search history.

(56) References Cited

U.S. PATENT DOCUMENTS

| | | | |
|---|---|---|---|
| 6,480,767 B2 * | 11/2002 | Yamaguchi et al. | ............ 701/22 |
| 2005/0274553 A1 * | 12/2005 | Salman et al. | ............... 180/65.2 |
| 2009/0146615 A1 | 6/2009 | Zillmer et al. | |

(Continued)

FOREIGN PATENT DOCUMENTS

| | | |
|---|---|---|
| JP | S6261832 A | 3/1987 |
| JP | H05-115108 | 5/1993 |

(Continued)

OTHER PUBLICATIONS

Translation of Jan. 27, 2015 Office Action issued in Japanese Application No. 2013-535670.

*Primary Examiner* — Calvin Cheung
(74) *Attorney, Agent, or Firm* — Oliff PLC

(57) ABSTRACT

A vehicle (100) includes a motor generator (130) generating driving power for running the vehicle (100), and an ECU (300) for controlling the motor generator (130). The ECU (300) causes driving power variation operation to be performed on the motor generator (130) in which the motor generator is switched between a first state (low output state) in which the motor generator generates driving power of a prescribed level and a second state (high output state) in which the motor generator generates driving power larger than the driving power in the first state to run the vehicle (100). As a result, energy efficiency of the vehicle (100) is improved.

18 Claims, 17 Drawing Sheets

(56) References Cited

U.S. PATENT DOCUMENTS

2010/0274427 A1* 10/2010 Ebuchi et al. .................. 701/22
2013/0211686 A1* 8/2013 Shono et al. .................. 701/70

FOREIGN PATENT DOCUMENTS

| JP | 2001-57710 A | 2/2001 |
| JP | A-2005-124287 | 5/2005 |
| JP | A-2005-160252 | 6/2005 |
| JP | A-2007-187090 | 7/2007 |
| JP | A-2008-520485 | 6/2008 |
| JP | A-2009-298232 | 12/2009 |
| JP | A-2010-6309 | 1/2010 |
| JP | A-2010-93947 | 4/2010 |
| JP | 2010209902 A | 9/2010 |
| JP | 2011011648 A | 1/2011 |

* cited by examiner

VEHICLE AND METHOD OF CONTROLLING VEHICLE

TECHNICAL FIELD

The present invention relates to vehicles and methods of controlling the vehicles, and more particularly to running control of a vehicle running with inertial force of the vehicle.

BACKGROUND ART

In recent years, vehicles incorporating a power storage device (such as a secondary battery or capacitor) and running with driving power generated from electric power stored in the power storage device have been receiving attention as environmentally friendly vehicles. Examples of such vehicles include an electric vehicle, a hybrid vehicle, and a fuel cell vehicle.

There is a need to improve energy efficiency of these vehicles by increasing gasoline mileage and electric mileage, so as to further reduce environmental loads.

Japanese National Patent Publication No. 2008-520485 (PTD 1) discloses a hybrid vehicle including an internal combustion engine and a motor generator, in which the motor generator is controlled, when in a generator mode, in such a manner that the motor generator alternates between a first interval during which the motor generator is driven to operate with a high output which is greater than an actual power consumption of a vehicle electrical system and a second interval during which the motor generator is switched off.

According to Japanese National Patent Publication No. 2008-520485 (PTD 1), when the motor generator operates as a generator, the motor generator is driven at an operating point of high efficiency in the first interval and the motor generator is stopped in the second interval. As a result, continuation of the operation of the motor generator with low efficiency during operation of electric power generation can be suppressed, thus improving energy efficiency of the vehicle during the operation of electric power generation.

Japanese Patent Laying-Open No. 2010-6309 (PTD 2) discloses a hybrid vehicle including an internal combustion engine and a motor generator, which is configured to alternate between running with driving power generated by the internal combustion engine and running in a coasting state in which the internal combustion engine is stopped. As a result, the internal combustion engine can be driven at an operating point of high efficiency, thus improving gasoline mileage.

CITATION LIST

Patent Documents

PTD 1: Japanese National Patent Publication No. 2008-520485
PTD 2: Japanese Patent Laying-Open No. 2010-6309
PTD 3: Japanese Patent Laying-Open No. 2009-298232
PTD 4: Japanese Patent Laying-Open No. 2007-187090

SUMMARY OF INVENTION

Technical Problem

In the configuration of Japanese National Patent Publication No. 2008-520485 (PTD 1) described above, however, driving and stopping of the motor generator is repeated when the motor generator generates electric power, rather than varying the driving power for running the vehicle.

In the configuration disclosed in Japanese Patent Laying-Open No. 2010-6309 (PTD 2), driving and stopping of an engine which is the internal combustion engine is repeated in the hybrid vehicle.

When driving and stopping of a driving source is repeated as described above, a loss may occur during a shift to (at the start of) a driven state from a stopped state.

The present invention has been made in order to solve such problems, and an object of the present invention is to improve energy efficiency during running of a vehicle capable of running with driving power from an engine and/or a motor generator.

Solution to Problem

A vehicle according to the present invention includes a driving source generating driving power for running the vehicle, and a control device for controlling the driving source. The control device causes driving power variation operation to be performed on the driving source in which the driving source is switched between a first state where the driving source generates driving power of a prescribed level and a second state where the driving source generates driving power larger than the driving power in the first state to run the vehicle.

Preferably, the control device causes the driving power variation operation to be performed, when driving power requested by a user varies within a prescribed range.

Preferably, the control device causes switching between the first and second states so as to maintain a speed of the vehicle within an acceptable range, while the driving power variation operation is performed.

Preferably, the control device causes switching to the first state in response to an increase in the speed of the vehicle to an upper limit of the acceptable range, and causes switching to the second state in response to a decrease in the speed of the vehicle to a lower limit of the acceptable range.

Preferably, the driving power in the first state is set to be smaller than reference driving power of constant output capable of maintaining a speed of the vehicle, and the driving power in the second state is set to be larger than the reference driving power.

Preferably, the vehicle runs mainly with inertial force of the vehicle in the first state.

Preferably, the driving source includes a rotating electric machine. The control device causes the driving power variation operation to be performed with the rotating electric machine.

Preferably, the vehicle further includes an engine capable of generating driving power for the vehicle, as another driving source different from the driving source. During a period when the driving power variation operation is performed by the rotating electric machine, the control device causes interval operation to be performed on the engine in which the engine is switched between a first running pattern where the generation of the driving power by the engine is stopped and a second running pattern where the driving power generated by the engine is used for running.

Preferably, the control device causes, when the rotating electric machine is switched to the second state while the engine is in the second running pattern, the driving power generated by the rotating electric machine to be smaller than the driving power when the rotating electric machine is switched to the second state while the engine is in the first running pattern.

Preferably, the control device causes the engine to be switched to the second running pattern during a period when the rotating electric machine is in the second state.

Preferably, the vehicle further includes a power storage device supplying electric power to the rotating electric machine, and a generator configured to be driven by the engine to generate electric power for charging the power storage device. The control device causes the engine to be switched to the second running pattern when the generator is driven to charge the power storage device.

Preferably, the vehicle further includes a power storage device supplying electric power to the rotating electric machine, and a generator configured to be driven by the engine to generate electric power for charging the power storage device. The control device causes the generator to be driven to charge the power storage device when the engine is in the second running pattern. The control device causes, when the engine is in the second running pattern, the driving power of the engine when generating electric power by the generator to be larger than the driving power of the engine when not generating electric power by the generator.

Preferably, in the vehicle, the driving source includes an engine. The control device causes the driving power variation operation to be performed with the engine.

Preferably, the vehicle further includes a rotating electric machine capable of generating driving power for the vehicle, as another driving source different from the driving source. During a period when the driving power variation operation is performed by the engine, the control device causes interval operation to be performed on the rotating electric machine in which the rotating electric machine is switched between a first running pattern where the generation of the driving power by the rotating electric machine is stopped and a second running pattern where the driving power generated by the rotating electric machine is used for running.

Preferably, the control device causes, when the rotating electric machine is switched to the second running pattern while the engine is in the second state, the driving power generated by the rotating electric machine to be smaller than the driving power when the rotating electric machine is switched to the second state while the engine is in the first state.

Preferably, the control device causes the rotating electric machine to be switched to the second running pattern during a period when the engine is in the second state.

Preferably, the vehicle further includes a power storage device supplying electric power to the rotating electric machine, and a generator configured to be driven by the engine to generate electric power for charging the power storage device. The control device causes the engine to be switched to the second state when the generator is driven to charge the power storage device.

Preferably, the vehicle further includes a power storage device supplying electric power to the rotating electric machine, and a generator configured to be driven by the engine to generate electric power for charging the power storage device. The control device causes the generator to be driven to charge the power storage device when the engine is in the second state. The control device causes, when the engine is in the second state, the driving power of the engine when generating electric power by the generator to be larger than the driving power of the engine when not generating electric power by the generator.

Preferably, the vehicle further includes another driving source capable of generating driving power for the vehicle, which is different from the driving source. The driving source and the another driving source are a first rotating electric machine and a second rotating electric machine, respectively. The control device causes the driving power variation operation to be performed with the first rotating electric machine. During a period when the driving power variation operation is performed by the first rotating electric machine, the control device causes interval operation to be performed on the second rotating electric machine in which the second rotating electric machine is switched between a first running pattern where the generation of the driving power by the second rotating electric machine is stopped and a second running pattern where the driving power generated by the second rotating electric machine is used for running.

Running control of a vehicle according to the present invention is a method of controlling a vehicle including a driving source generating driving power for running, including the steps of putting the driving source in a first state where the driving source generates driving power of a prescribed level, putting the driving source in a second state where the driving source generates driving power larger than the driving power in the first state, and performing driving power variation operation of switching between the first and second states to run the vehicle.

Advantageous Effects of Invention

According to the present invention, energy efficiency can be improved during running of a vehicle capable of running with driving power from an engine and/or a motor generator.

DESCRIPTION OF EMBODIMENTS

Figure 1:
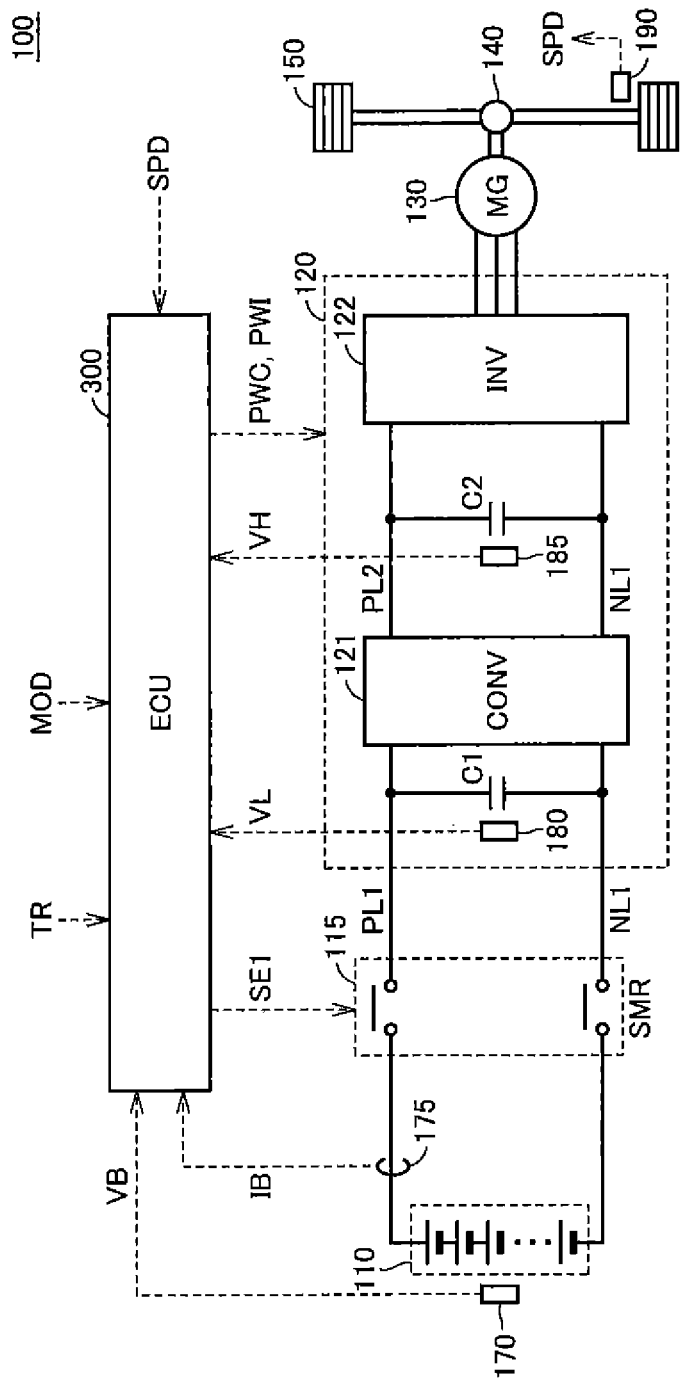
FIG. 1 is an overall block diagram of a vehicle according to a first embodiment.

Embodiments of the present invention will be hereinafter described in detail with reference to the drawings, in which the same or corresponding elements are designated by the same reference characters, and the description thereof will not be repeated.

First Embodiment

FIG. 1 is an overall block diagram of a vehicle 100 according to a first embodiment of the present invention. As will be described below in detail, vehicle 100 is an electric vehicle including a rotating electric machine as a driving source.

Referring to FIG. 1, vehicle 100 includes a power storage device 110, a system main relay (SMR) 115, a PCU (Power Control Unit) 120 which is a driving device, a motor generator 130, a power transmission gear 140, a drive wheel 150, and an ECU (Electronic Control Unit) 300 which is a control device. PCU 120 includes a converter 121, an inverter 122, voltage sensors 180, 185, and capacitors C1, C2.

Power storage device 110 is an electric power storage component configured in a chargeable/dischargeable manner. Power storage device 110 includes a secondary battery such as a lithium-ion battery, a nickel-metal hydride battery or a lead-acid battery, or a power storage element such as an electric double layer capacitor.

Power storage device 110 is connected to PCU 120 through power lines PL1 and NL1. Power storage device 110 supplies PCU 120 with electric power for generating driving power for vehicle 100. Power storage device 110 stores electric power generated by motor generator 130. An output of power storage device 100 is, for example, about 200 V.

Power storage device 110 is provided with a voltage sensor 170 and a current sensor 175. Voltage sensor 170 detects a voltage VB of power storage device 110, and outputs the result of the detection to ECU 300. Current sensor 175 detects a current 1B input to and output from the power storage device, and outputs the detected values to ECU 300.

SMR 115 includes a relay having one end connected to a positive electrode terminal of power storage device 110 and the other end connected to power line PL1 that is connected to PCU 120, and another relay having one end connected to a negative electrode terminal of power storage device 110 and the other end connected to power line NL1 that is connected to PCU 120. In response to a control signal SE1 from ECU 300, SMR 115 switches between supply and interruption of electric power between power storage device 110 and PCU 120.

In response to a control signal PWC from ECU 300, converter 121 converts a voltage between power lines PL1, NL1 and power lines PL2, NL1.

Inverter 122 is connected to power lines PL2 and NL1. In response to a control signal PWI from ECU 300, inverter 122 converts DC power from converter 121 to AC power, to drive motor generator 130.

Capacitor C1 is provided between power lines PL1 and NL1, and reduces voltage variation between power lines PL1 and NL1. Capacitor C2 is provided between power lines PL2 and NL1, and reduces voltage variation between power lines PL2 and NL1.

Voltage sensors 180 and 185 detect voltages VL and VH across capacitors C1 and C2, respectively, and output the detected values to ECU 300.

Motor generator 130 is an AC rotating electric machine, for example, a permanent magnet synchronous motor including a rotor in which a permanent magnet is embedded.

An output torque of motor generator 130 is transmitted to drive wheel 150 through power transmission gear 140 including a reduction gear and a power split device, to run vehicle 100. During regenerative braking operation of vehicle 100, motor generator 130 can generate electric power by rotation of drive wheel 150. The generated electric power is then converted by PCU 120 to charging power for power storage device 110.

A speed sensor 190 is provided in the vicinity of drive wheel 150 so as to detect the speed of vehicle 100 (vehicle speed). Speed sensor 190 detects a vehicle speed SPD based on a rotational speed of drive wheel 150, and outputs the detected value to ECU 300. As a speed sensor, a rotation angle sensor (not shown) for detecting a rotation angle of motor generator 130 may be used. In this case, ECU 300 causes vehicle speed SPD to be indirectly computed based on temporal variation in rotation angle of motor generator 130, a reduction ratio and the like.

Although not shown in FIG. 1, ECU 300 includes a CPU (Central Processing Unit), a storage device and an input/output buffer, causes input of signals from various sensors and the like and output of control signals to various devices, and controls the various devices of power storage device 110 and vehicle 100. Such control is not limited to software processing, but may be processed by dedicated hardware (electronic circuitry).

ECU 300 causes generation and output of control signals for controlling PCU 120, SMR 115 and the like. Although FIG. 1 shows a configuration where one control device is provided as ECU 300, a control device may be provided for each function or for each device to be controlled, such as a control device for PCU 120 and a control device for power storage device 110.

ECU 300 causes an SOC (State of Charge) of power storage device 110 to be computed based on the detected values of voltage VB and current IB from voltage sensor 170 and current sensor 175 provided on power storage device 110.

ECU 300 receives a request torque TR, which is determined based on operation of an accelerator pedal (not shown) by a user, from an upper ECU (not shown). ECU 300 causes generation of controls signals PWC and PWI for converter 121 and inverter 122 based on request torque TR from the user, respectively, to drive motor generator 130.

ECU 300 also receives a mode signal MOD which is set by the user. This mode signal MOD is a signal for indicating whether or not inertial running control which will be described later should be performed. Mode signal MOD is switched through a specific switch or setting on an operation screen. Alternatively, mode signal MOD may be automatically set when specific conditions are satisfied.

For example, ECU 300 operates such that the inertial running control is performed when mode signal MOD is set to ON, and operates such that normal running is performed without the inertial running control when mode signal MOD is set to OFF.

In such a vehicle, the electric power in the power storage device is consumed when driving power is generated by motor generator 130. Since power storage device 110 has a predetermined capacity, there is a need to improve energy efficiency during running to suppress power consumption in order for the vehicle to run the longest distance possible with the electric power stored in the power storage device.

Inertial force acts on a vehicle during vehicle running. Thus, if driving power generated by a motor generator is made lower during running than driving power required to maintain the vehicle speed, running with the inertial force of the vehicle (hereinafter also referred to as "inertial running") is continued for some time while the vehicle speed gradually decreases.

During this inertial running, the motor generator outputs small driving power, thus reducing power consumption by the power storage device. Accordingly, if the vehicle can run utilizing the inertial running, energy efficiency during the vehicle running can be improved.

Thus, according to the first embodiment, in the electric vehicle shown in FIG. 1, when the request torque from the user is substantially constant and the vehicle is running at a vehicle speed thereby maintained substantially constant, the inertial running control is performed in which operation of repeating a high output state of driving power from the motor generator and a low output state of driving power from the motor generator (hereinafter also referred to as "driving power variation operation") is performed to run the vehicle, thereby improving energy efficiency during running.

Figure 2:
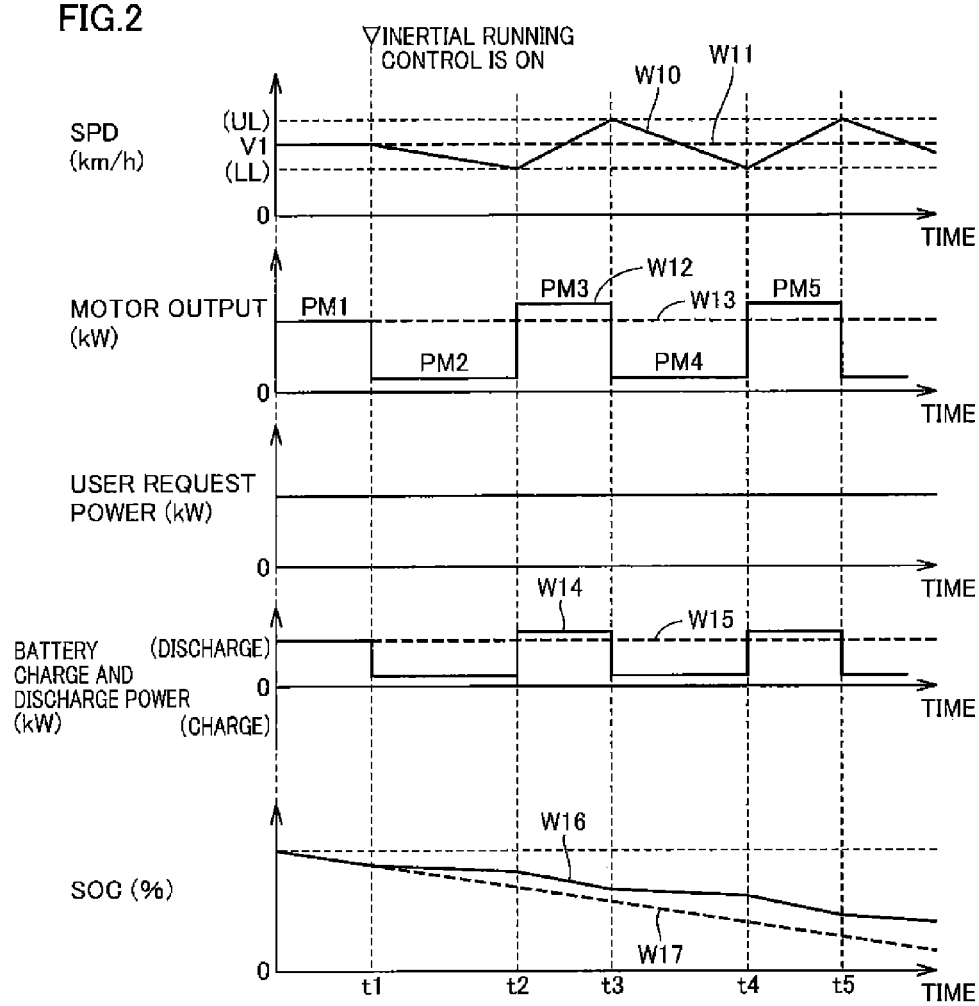
FIG. 2 is a time chart illustrating the outline of inertial running control in the first embodiment.

FIG. 2 is a time chart illustrating the outline of the inertial running control in the first embodiment. In FIG. 2, a horizontal axis represents time, and a vertical axis represents vehicle speed SPD, the output of the motor generator, request power from the user, charge and discharge power of the power storage device, and the SOC of the power storage device. Regarding the charge and discharge power of the power storage device, the discharge power is represented as positive value and the charge power is represented as negative value.

Referring to FIGS. 1 and 2, it is assumed, for example, that vehicle 100 runs on a flat road at a constant vehicle speed V1. In this case, power requested by the user is given as a substantially constant value, as shown in FIG. 2. That "power requested by the user is a substantially constant value" refers to a state in which the user request power is maintained within a predetermined range (e.g., ±3 km/h) during a prescribed period of time, albeit with some variation.

When the inertial running control in the first embodiment is not applied, an output of substantially constant magnitude is continuously provided from motor generator 130, as indicated by a broken line W13 in FIG. 2. As such, vehicle speed SPD is maintained substantially constant, as indicated by a broken line W11 in FIG. 2.

At this time, power storage device 110 continuously outputs constant electric power as indicated by a broken line W15 in FIG. 2, causing the SOC of power storage device 110 to linearly decrease as indicated by a broken line W17 in FIG. 2.

In contrast, when the inertial running control in the first embodiment is applied, acceleration running in which the driving power of motor generator 130 is in a high output state and inertial running in which the driving power of motor generator 130 is in a low output state are alternately repeated.

Specifically, until time t1, the inertial running control in the first embodiment is not applied, and a motor output PM1 is continuously provided.

When the user indicates that the inertial running control should be performed at time t1, the driving power of motor generator 130 is decreased from PM1 to PM2 (a solid line W12 in FIG. 2). Since driving power PM2 is smaller than the driving power capable of maintaining current vehicle speed V1, running with the inertial force is started and vehicle speed SPD gradually decreases, as indicated by a solid line W10 in FIG. 2.

At this time, the charge and discharge power of power storage device 110 decreases (a solid line W14 in FIG. 2). Thus, a decrease in SOC is suppressed (a solid line W16 in FIG. 2) as compared to the example where a constant output is provided.

Then, when vehicle speed SPD decreases to a lower limit value LL of a predetermined acceptable range with respect to target vehicle speed V1 (time t2 in FIG. 2), motor generator 130 is switched to be driven in a high output state. The motor output at this time is set to PM3 larger than output PM1 required to maintain vehicle speed V1. Vehicle 100 is thus accelerated. During this acceleration running, although a decrease in SOC is slightly larger than when the inertial running control is not performed, power consumption is suppressed by the inertial running between times t1 and t2, causing the total SOC to be maintained at a high level (solid line W16 in FIG. 2) as compared to the example where a constant output is provided.

Then, when vehicle speed SPD increases to an upper limit value UL of the predetermined acceptable range, motor generator 130 is put in a low output state again (time t3 in FIG. 2) and inertial running is performed.

Then, in a similar manner, motor generator 130 is switched to a high output state when vehicle speed SPD decreases to lower limit value LL, and motor generator 130 is switched to a low output state when vehicle speed SPD increases to upper limit value UL.

By repeating such driving power variation operation, a decrease in SOC of the power storage device can be suppressed while an average speed of vehicle speed SPD is maintained substantially at V1, although vehicle speed SPD varies within the above acceptable range. As a result, energy efficiency can be improved as a whole, thereby increasing the distance that can be traveled with the electric power stored in the power storage device.

It is to be noted that the motor output and acceleration time when the motor generator performs acceleration running can be set appropriately. For example, the acceleration time may be set to a prescribed period of time, and the motor output may be set such that vehicle speed SPD can be increased from lower limit value LL to upper limit value UL during that period. Alternatively, the motor output used for acceleration may be set to a prescribed output, and the acceleration time may be set depending on the situation. If the acceleration time is too short, large power is needed, which may cause torque shock. If the motor output is too small, on the other hand, the acceleration time, namely, driving time of the motor generator is increased, making it difficult to perform inertial running. Therefore, the acceleration time and the motor output during acceleration are set appropriately in consideration of drivability and energy efficiency.

It is to be noted that the motor outputs in a high output state may be the same as one another (PM3=PM5) or may be different from one another (PM3≠PM5) in magnitude. The motor outputs in a low output state may likewise be the same as one another (PM2=PM4) or may be different from one another (PM2≠PM4) in magnitude.

In the inertial running control according to the first embodiment, as described above, the driving power variation operation as shown in FIG. 2 is performed when the user request power is substantially constant. In other words, the driving power variation operation is not performed during acceleration and deceleration when the user request power varies.

Figure 3:
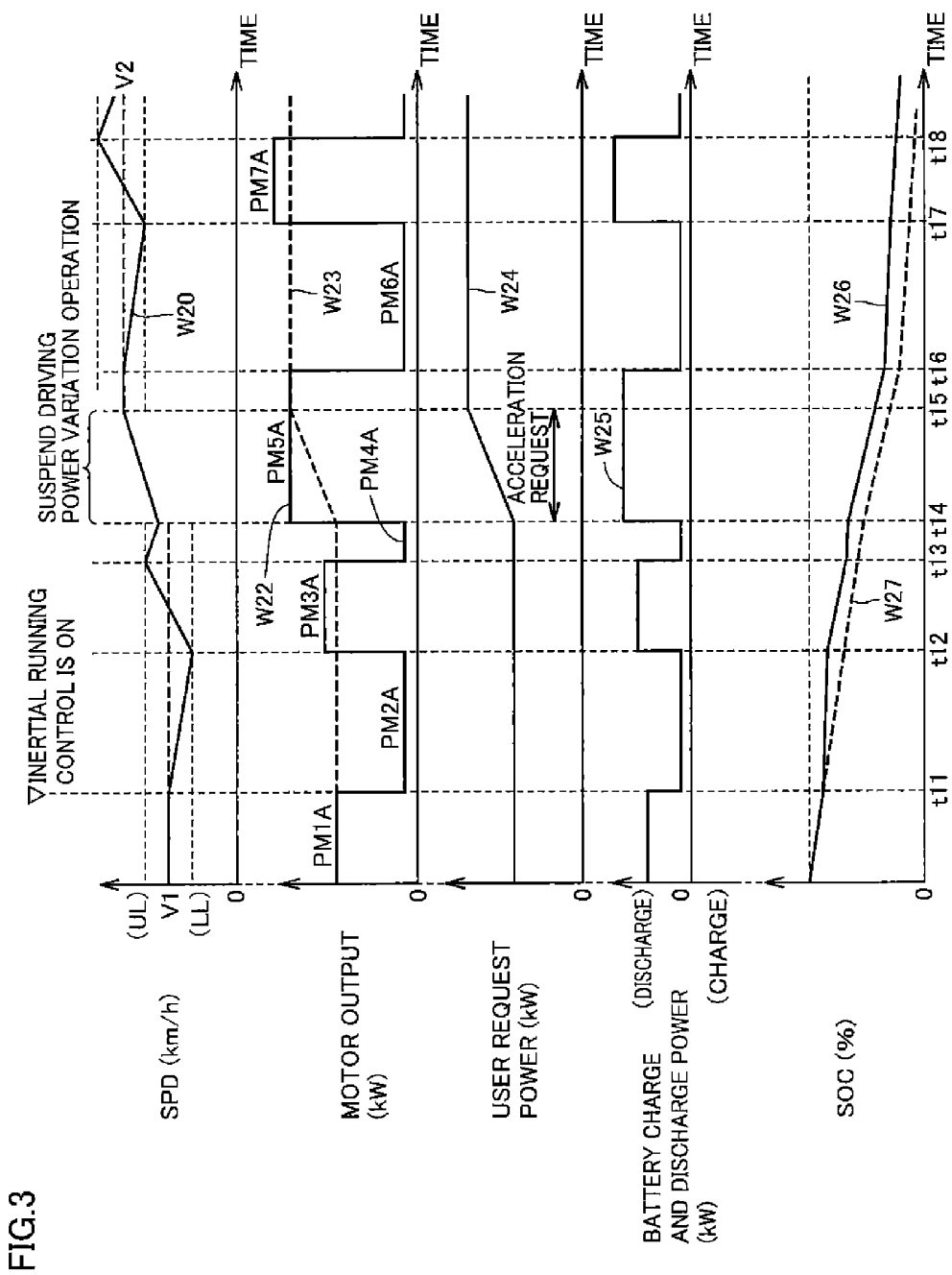
FIG. 3 is a time chart illustrating operation during acceleration in the inertial running control.
Figure 4:
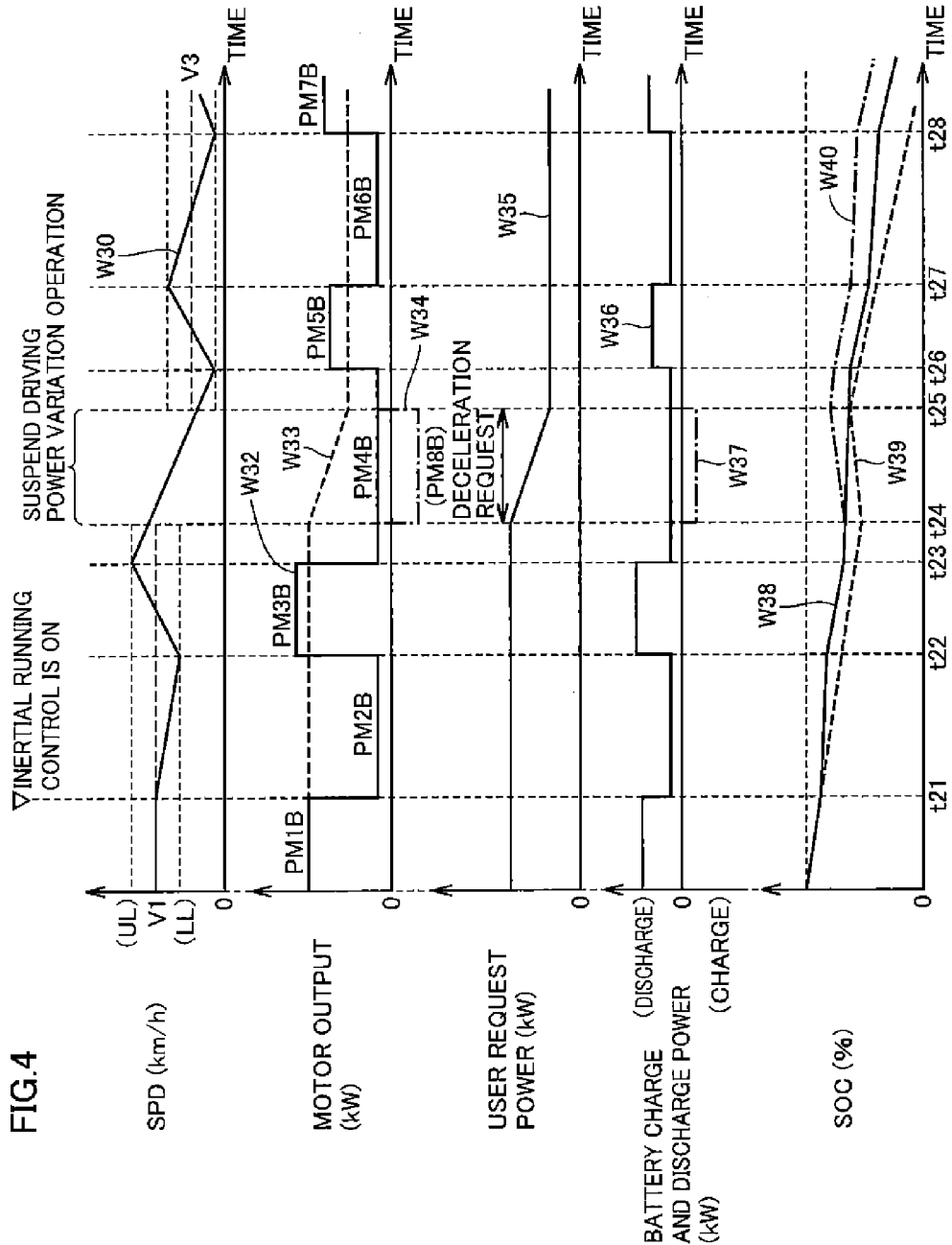
FIG. 4 is a time chart illustrating operation during deceleration in the inertial running control.

FIGS. 3 and 4 illustrate operations during acceleration and deceleration, respectively, when the inertial running control is applied. In FIGS. 3 and 4, in a manner similar to FIG. 2, a horizontal axis represents time, and a vertical axis represents vehicle speed SPD, the output of the motor generator, request power from the user, charge and discharge power of the power storage device, and the SOC of the power storage device.

Referring to FIGS. 1 and 3, when the user indicates that the inertial running control should be performed at time t11, in a manner similar to FIG. 2, the driving power variation operation is performed so as to maintain vehicle speed V1 until time t14.

Then, when an acceleration request is received with an increase in user request power at time t14 during inertial running (a solid line W24 in FIG. 3), the driving power variation operation is suspended while the user request power varies (between times t14 and t15). Then, the motor output is increased to PM5A for acceleration (a solid line W22 in FIG. 3).

Then, when the acceleration operation by the user ends and vehicle speed SPD becomes constant at V2 (V2>V1) at time t15, the output from motor generator 130 is put in a low output state again, and the driving power variation operation is resumed so as to maintain vehicle speed V2 (a solid line W20 in FIG. 3).

Next, the operation during deceleration is described with reference to FIG. 4. Referring to FIGS. 1 and 4, the driving power variation operation is performed at vehicle speed V1 until time t24, as with the period until time t14 in FIG. 1

Then, when a deceleration request is received with a decrease in user request power at time t24 during inertial running (a solid line W35 in FIG. 4), the driving power variation operation is suspended while the user request power varies (between times t24 and t25). At this time, the motor output is put in a low output state, and the vehicle is decelerated while maintaining an inertial running state (a solid line W32 in FIG. 4). Although not shown in FIG. 4, when a deceleration request is received during acceleration running, acceleration operation is suspended and the running is shifted to inertial running.

Alternatively, if the vehicle needs to be decelerated more quickly, regenerative braking may be performed by motor generator 130 during a period when a deceleration request is received. In this case, motor generator 130 outputs a negative motor output PM8B by power regeneration (a chain-dotted line W34 in FIG. 4), and charges power storage device 110 with the generated electric power (a chain-dotted line W37 in FIG. 4). The SOC is thus increased (a chain-dotted line W40 in FIG. 4).

It is to be noted that SOC variation when the inertial running control is not applied, as indicated by a broken line W39 in FIG. 4, indicates a state in which regenerative braking is performed by motor generator 130 during the period of the deceleration request (between times t24 and t25). Thus, the SOC is increased between times t24 and t25. When the inertial running is performed without regenerative braking during the period of the deceleration request (between times t24 and t25), on the other hand, motor generator 130 is driven in a low output state between times t24 and t25, although not shown in FIG. 4. Thus, the SOC indicated by broken line W39 in FIG. 4 is slightly decreased.

In this manner, if the vehicle is accelerated or decelerated in response to the variation in user request power while the inertial running control is applied, the driving power variation operation of motor generator 130 is suspended.

Figure 5:
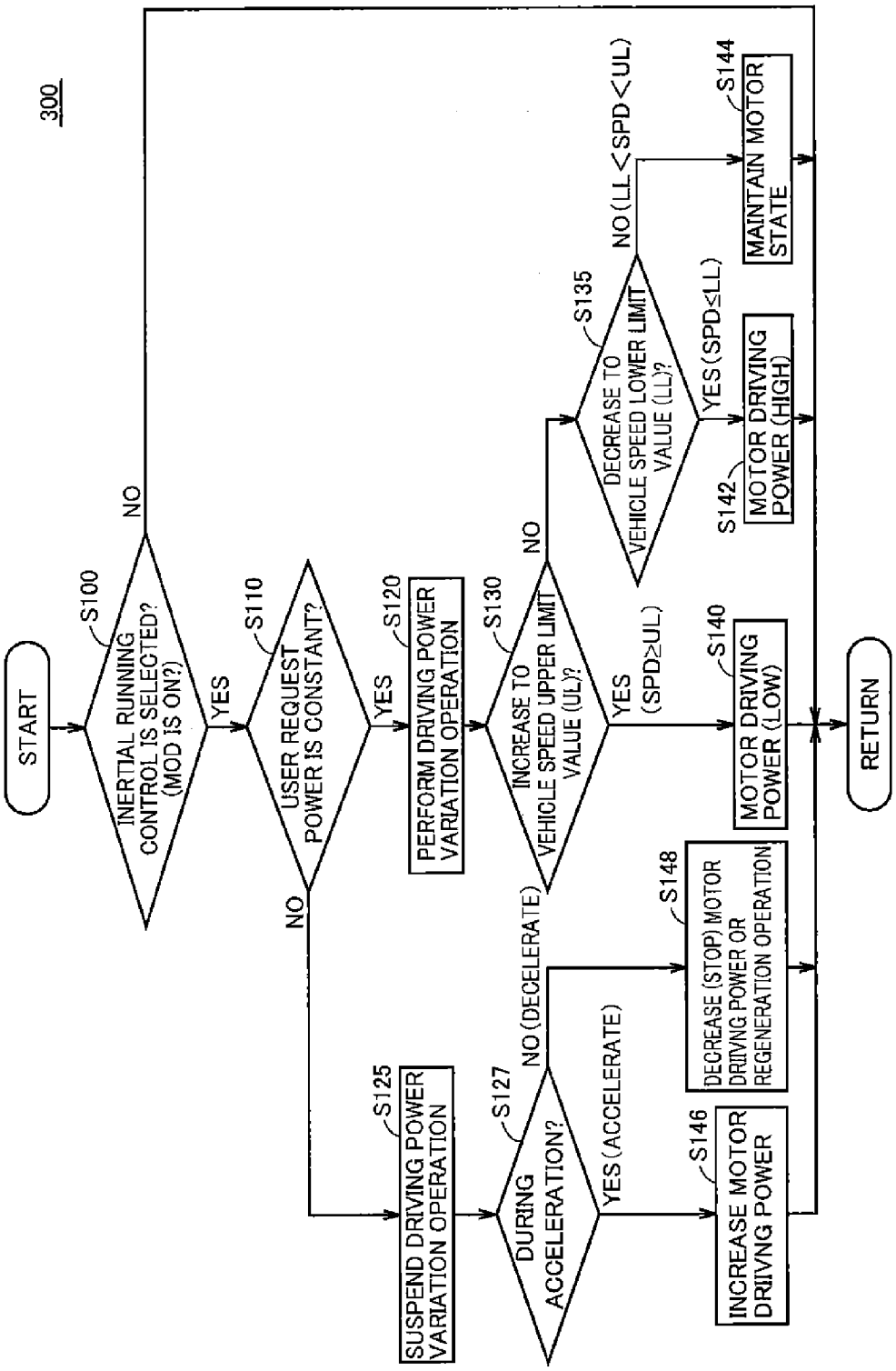
FIG. 5 is a flow chart illustrating a process of the inertial running control performed by an ECU in the first embodiment.

FIG. 5 is a flow chart illustrating a process of the inertial running control performed by ECU 300 in the first embodiment. The steps in the flow charts shown in FIG. 5 and FIGS. 7, 10, 12, 14 and 16 described later are implemented by executing a program stored in advance in ECU 300 at regular intervals. Alternatively, processing of part of the steps may be implemented by building dedicated hardware (electronic circuitry).

Referring to FIGS. 1 and 5, in step (the step is hereinafter abbreviated as S) 100, ECU 300 causes a determination to be made of whether or not the inertial running control has been selected based on mode signal MOD which is set by the user.

If mode signal MOD has been set to OFF and the inertial running control has not been selected (NO in S100), the subsequent processing is skipped and ECU 300 causes the process to return to a main routine.

If mode signal MOD has been set to ON and the inertial running control has been selected (YES in S100), the process proceeds to S110 where ECU 300 causes a determination to be made of whether or not the user request power is substantially constant based on request torque TR.

If the user request power is substantially constant (YES in S110), the process proceeds to S120 where ECU 300 causes a selection to be made such that the driving power variation operation is performed. Although not shown in FIG. 5, immediately after the start of the driving power variation operation, motor generator 130 is initially put in a low output state and inertial running is performed, as shown in FIGS. 2 to 4.

Then, in S130, ECU 300 causes a determination to be made of whether or not vehicle speed SPD has increased to upper limit value UL of the acceptable speed range.

As described above, immediately after the start of the driving power variation operation, motor generator 130 is initially put in a low output state and inertial running is performed. Thus, vehicle speed SPD is lower than upper limit value UL, and gradually decreases.

That is, since vehicle speed SPD has not increased to upper limit value UL of the acceptable speed range (NO in S130), the process proceeds to S135 where ECU 300 causes a determination to be made of whether or not vehicle speed SPD has decreased to lower limit value LL of the acceptable speed range.

When vehicle speed SPD is decreasing within the acceptable speed range (LL<SPD<UL), namely, if vehicle speed SPD has not decreased to lower limit value LL of the acceptable speed range (NO in S135), the process proceeds to S144 where ECU 300 causes a current state of motor generator 130 to be maintained, to continue the inertial running. The process then returns to the main routine, and the process is performed again from S100 in the next control cycle.

When vehicle speed SPD decreases to lower limit value LL of the acceptable speed range while the inertial running is continued (SPD≤LL) (YES in S135), the process proceeds to S142 where ECU 300 causes motor generator 130 to be switched to a high output state to perform acceleration running. Vehicle speed SPD is thus increased.

While the vehicle speed is increasing within the acceptable speed range by this acceleration running, NO is selected in S130 and S135. Then, in S144, ECU 300 causes the acceleration running to be continued until vehicle speed SPD reaches upper limit value UL of the acceptable speed range.

Then, when vehicle speed SPD increases to upper limit value UL of the acceptable speed range (YES in S130), the process proceeds to S140 where ECU 300 causes motor generator 130 to be switched to a low output state to perform inertial running.

While the user request power is maintained substantially constant, the driving power variation operation as described above is performed so as to maintain vehicle speed SPD within the acceptable speed range.

When the user request power varies for the purpose of acceleration or deceleration (NO in S110), on the other hand, the process proceeds to S125 where ECU 300 causes the driving power variation operation to be suspended.

Then, if acceleration is indicated by the user request power (YES in S127), ECU 300 causes motor generator 130 to be driven in a power running state, to accelerate vehicle 100 (S146).

If deceleration is indicated by the user (NO in S127), on the other hand, the process proceeds to S148 where ECU 300 causes either deceleration by inertial running in which motor generator 130 is switched to a low output state, or deceleration involving regenerative braking in which motor generator 130 is driven in a regenerative state, to be performed. Alternatively, the vehicle may be decelerated by switching between the deceleration by inertial running and the deceleration involving regenerative braking.

Then, when the acceleration or deceleration operation by the user ends and the user request power becomes substantially constant (YES in S110), the driving power variation operation is resumed.

By performing the control in accordance with the process as described above, when the user request power is substantially constant, the driving power variation operation of repeating inertial running and acceleration running can be performed to thereby improve energy efficiency during the vehicle running.

Second Embodiment

Although an electric vehicle having a motor generator as a driving source was described by way of example in the first embodiment, the driving power variation control described above is also applicable to a vehicle having an engine as a driving source.

For a vehicle that runs with driving power of an engine, there is known a technique of running the vehicle by driving and stopping the engine repeatedly during running, as described in Japanese Patent Laying-Open No. 2007-187090 (PTD 4), for example.

When a motor generator serves as a driving source, the motor generator can be switched from a stopped state to a driven state by controlling the switching of a switching element included in an inverter. Thus, a significant loss is unlikely to occur. When an engine serves as a driving source, however, starting operation is required. If the driving power is generated and stopped repeatedly, therefore, a loss occurs at every starting operation (cranking operation). Moreover, it takes some time between the start of the starting operation and the actual start of self-sustained operation of the engine, which may result in difficulty in generating the driving power with a quick response.

For a vehicle that runs with driving power of an engine, therefore, a response can be ensured while gasoline mileage is improved by reducing the driving power generated while maintaining the engine in a driven state, such as in the so-called idle state, rather than by stopping the engine as described in Japanese Patent Laying-Open No. 2007-187090 (PTD 4).

Thus, in the second embodiment, an example is described in which the driving power variation control described in the first embodiment is applied to a vehicle having an engine as a driving source.

Figure 6:
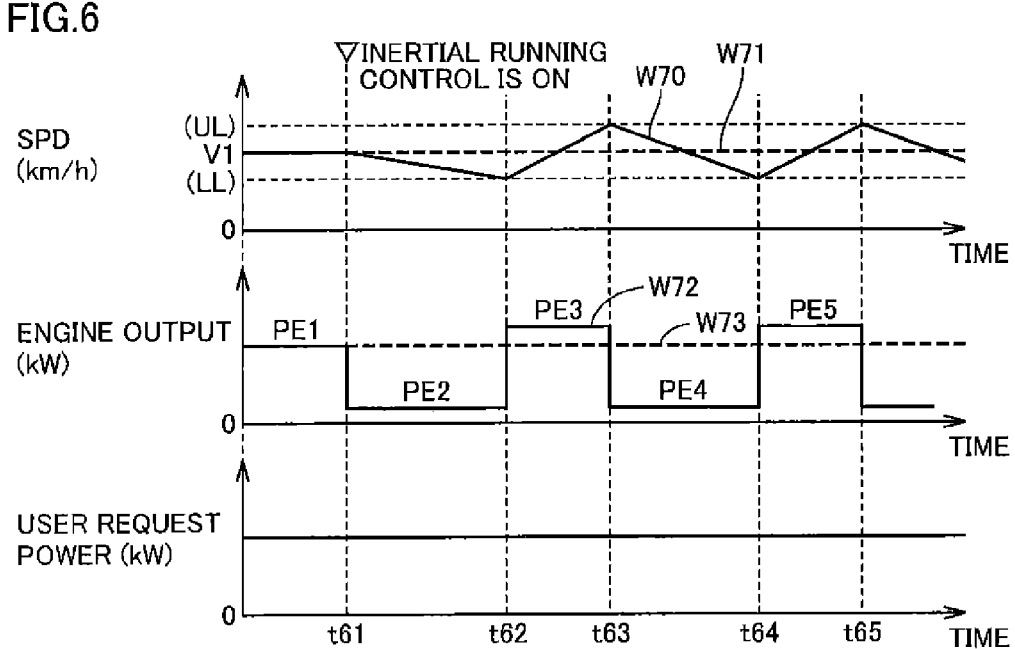
FIG. 6 is a time chart illustrating the outline of inertial running control in a second embodiment where an engine is provided as a driving source.

FIG. 6 is a time chart illustrating the outline of inertial running control in the second embodiment when an engine is provided as a driving source. In FIG. 6, a horizontal axis represents time, and a vertical axis represents vehicle speed SPD, the output of the engine, and request power from the user.

Referring to FIG. 6, it is assumed that a vehicle that runs with driving power of an engine runs on a flat road at constant vehicle speed V1. In this case, power requested by the user is given as a substantially constant value, as shown in FIG. 6.

When the inertial running control in the second embodiment is not applied, an output of substantially constant magnitude is continuously provided from the engine, as indicated by a broken line W73 in FIG. 6. As such, vehicle speed SPD is maintained substantially constant, as indicated by a broken line W71 in FIG. 2.

In contrast, when the inertial running control in the second embodiment is applied, acceleration running in which the driving power of the engine is in a high output state and inertial running in which the driving power of the engine is in a low output state are alternately repeated.

Specifically, until time t61, the inertial running control in the second embodiment is not applied, and an engine output PE1 is continuously provided.

When the user indicates that the inertial running control should be performed at time t61, transmission of the driving power from the engine to the drive wheel is discontinued by disengagement of a clutch and the like, for example, and the driving power of the engine is decreased from PE1 to PE2 (a solid line W72 in FIG. 2). As a result, running with the inertial force is started and vehicle speed SPD gradually decreases, as indicated by a solid line W70 in FIG. 2.

At this time, due to the decrease in engine output, an amount of fuel consumption is suppressed as compared to the example where a constant output is provided.

Then, when vehicle speed SPD decreases to lower limit value LL of the predetermined acceptable range with respect to target vehicle speed V1 (time t62 in FIG. 6), the clutch is engaged and the engine is switched to be driven in a high output state. The engine output at this time is set to PE3 larger than output PE1 required to maintain vehicle speed V1. The vehicle is thus accelerated.

Then, when vehicle speed SPD increases to upper limit value UL of the predetermined acceptable range, the engine is put in a low output state again (time t63 in FIG. 6) and inertial running is performed.

Then, in a similar manner, the engine is put in a high output state when vehicle speed SPD decreases to lower limit value LL, and the engine is put in a low output state when vehicle speed SPD increases to upper limit value UL.

Figure 7:
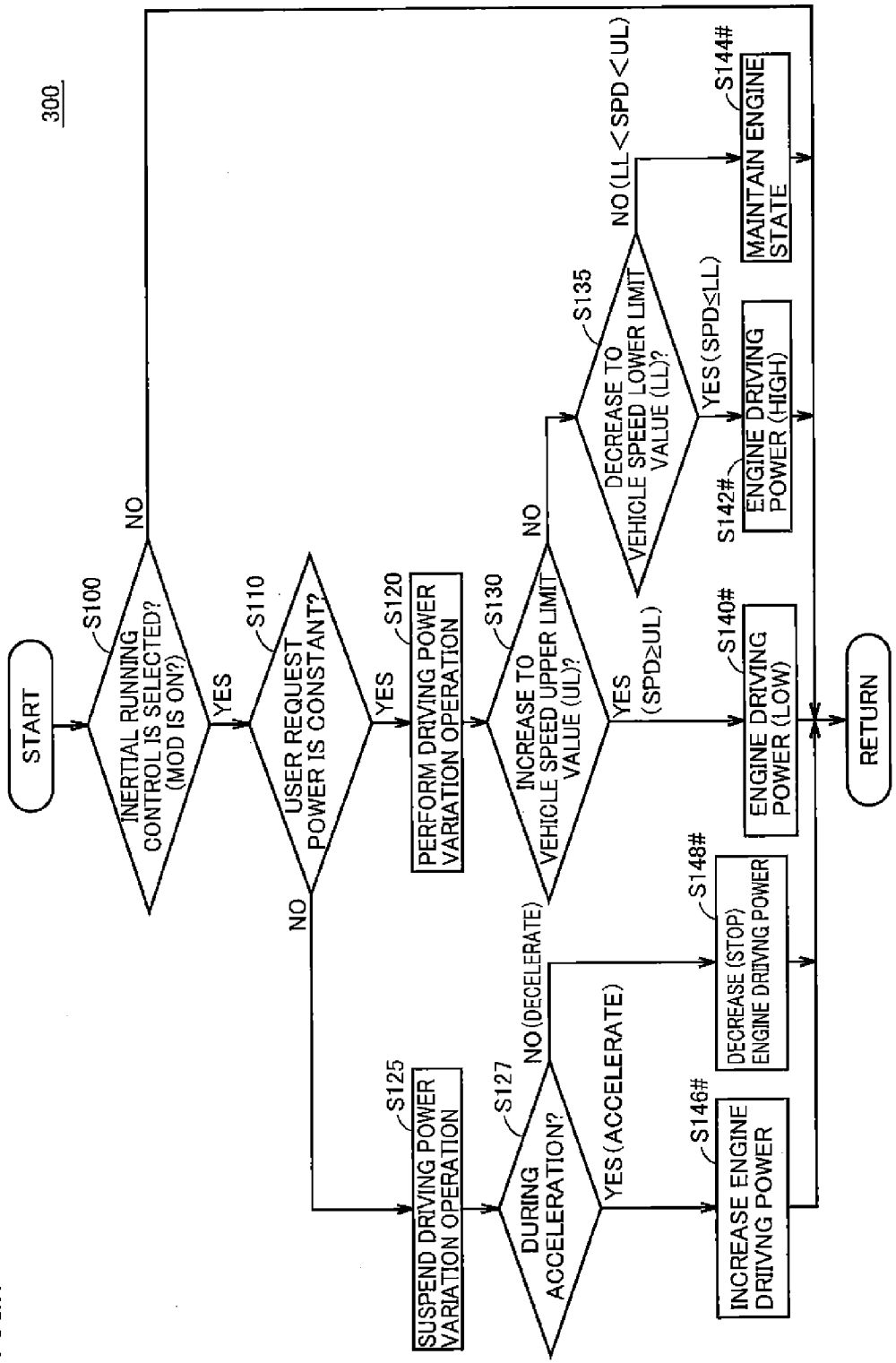
FIG. 7 is a flow chart illustrating a process of the inertial running control performed by an ECU in the second embodiment.

FIG. 7 is a flow chart illustrating a process of the inertial running control performed by the ECU in the second embodiment. In FIG. 7, steps S140, S142, S144, S146 and S148 in the flow chart of FIG. 5 according to the first embodiment are replaced by S140#, S142#, S144#, S146# and S148#, respectively. The only difference in the processing of the replaced steps is that the driving power is output from the engine instead of from the motor generator, and the contents of the process are otherwise similar to those in FIG. 5. Thus, the detailed descriptions of the contents of the process will not be repeated. Generally, the inertial running control is selected, and when the user request power is constant, the engine is switched to a high output state when the vehicle speed decreases to the lower limit value and the engine is switched to a low output state when the vehicle speed increases to the upper limit value.

In this manner, by applying the inertial running control to the vehicle having the engine as a driving source, a response can be ensured while gasoline mileage is improved.

Third Embodiment

In the first and second embodiments, the inertial running control was described in the example where a single motor generator or engine is provided as a driving source.

In a third embodiment, an example is described in which the inertial running control is applied to a vehicle that runs with driving power from a plurality of driving sources.

Figure 8:
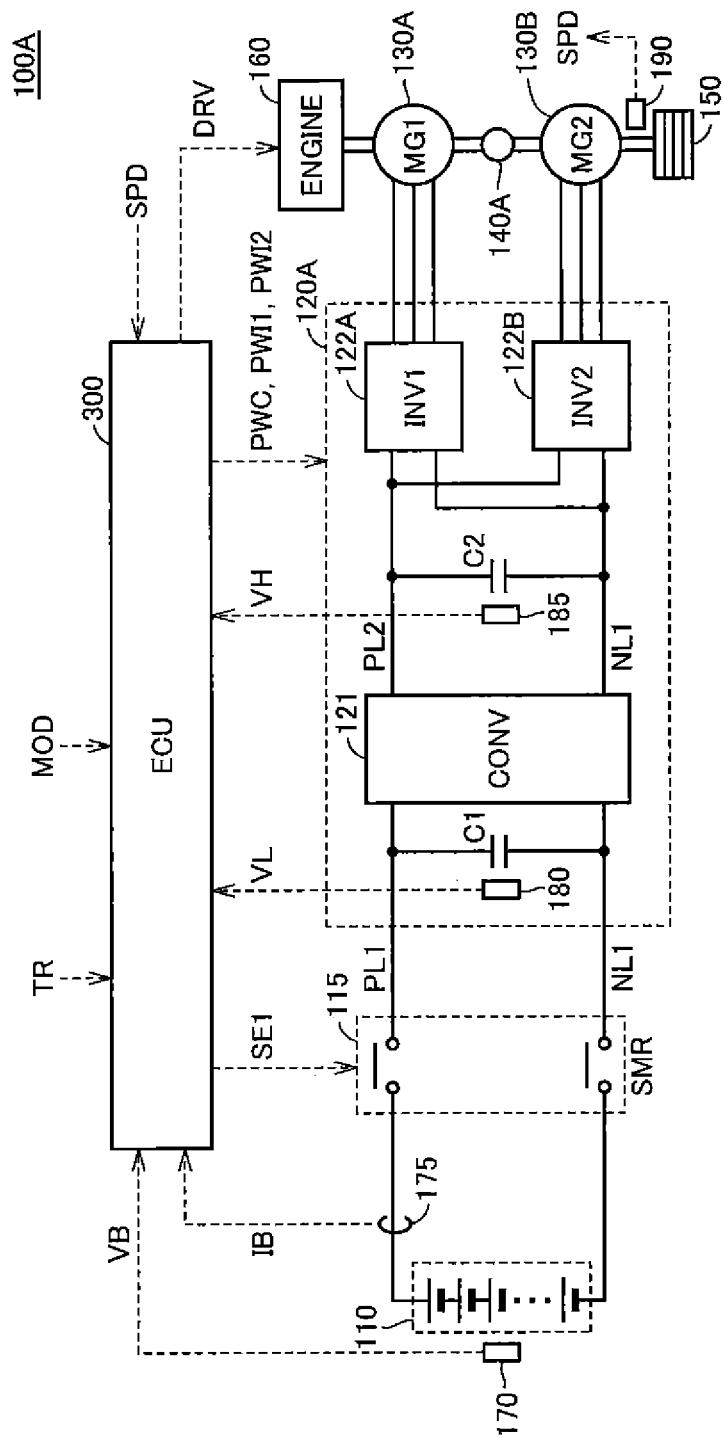
FIG. 8 is an overall block diagram of a hybrid vehicle according to a third embodiment.

FIG. 8 is an overall block diagram of a vehicle 100A according to the third embodiment. Vehicle 100A is a hybrid vehicle including a rotating electric machine and an engine which is an internal combustion engine as driving sources.

In FIG. 8, PCU 120 in FIG. 1 is replaced by a PCU 120A, and motor generator 130 is replaced by motor generators 130A, 130B and engine 160 as driving sources. The descriptions of the elements in FIG. 8 the same as those in FIG. 1 will not be repeated.

Referring to FIG. 8, PCU 120A includes converter 121, inverters 122A, 122B, capacitors C1, C2, and voltage sensors 180, 185.

Inverters 122A and 122B are connected in parallel to converter 121 through power lines PL2 and NL1.

Inverter 122A is controlled by a control signal PWI1 from ECU 300, and converts DC power from converter 121 to AC power, to drive motor generator 130A (hereinafter also referred to as an "MG1"). Inverter 122A also converts AC power generated by motor generator 130A to DC power, to charge power storage device 110 through converter 121.

Inverter 122B is controlled by a control signal PWI2 from ECU 300, and converts DC power from converter 121 to AC power, to drive motor generator 130B (hereinafter also referred to as an "MG2"). Inverter 122B also converts AC power generated by motor generator 130B to DC power, to charge power storage device 110 through converter 121.

Motor generators 130A and 130B have output shafts coupled to a power transmission gear 140A including a power split device such as a planetary gear. Driving power from motor generators 130A and 130B is transmitted to drive wheel 150.

Motor generators 130A and 130B are coupled to engine 160 through power transmission gear 140A. Engine 160 is controlled by a control signal DRV from ECU 300. Driving power generated by engine 160 is transmitted to drive wheel 150 and motor generator 130A through power transmission gear 140A. ECU 300 cooperatively controls driving power generated by motor generators 130A, 130B and engine 160, to run the vehicle.

In the third embodiment, motor generator 130A is used exclusively as a starter motor when starting engine 160 and as a generator for generating electric power by being driven by engine 160. Motor generator 130B is used exclusively as a motor for driving drive wheel 150 by using the electric power from power storage device 110.

Although FIG. 8 shows an exemplary configuration where two motor generators and one engine are provided, the number of motor generators is not limited as such. For example, one motor generator may be provided. Alternatively, more than two motor generators may be provided.

First Example of Third Embodiment

Figure 9:
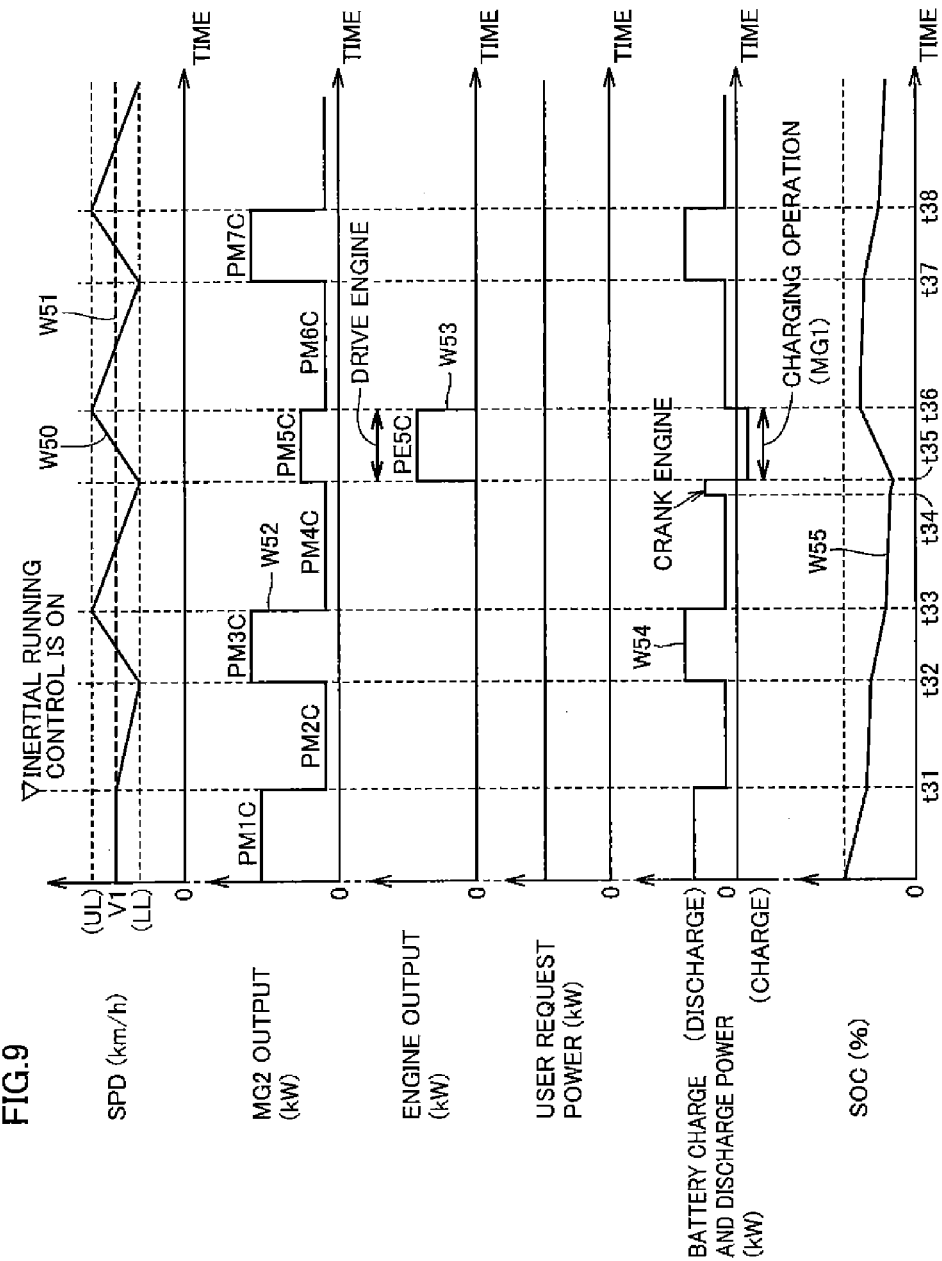
FIG. 9 is a time chart illustrating a first example of inertial running control in the third embodiment.
Figure 10:
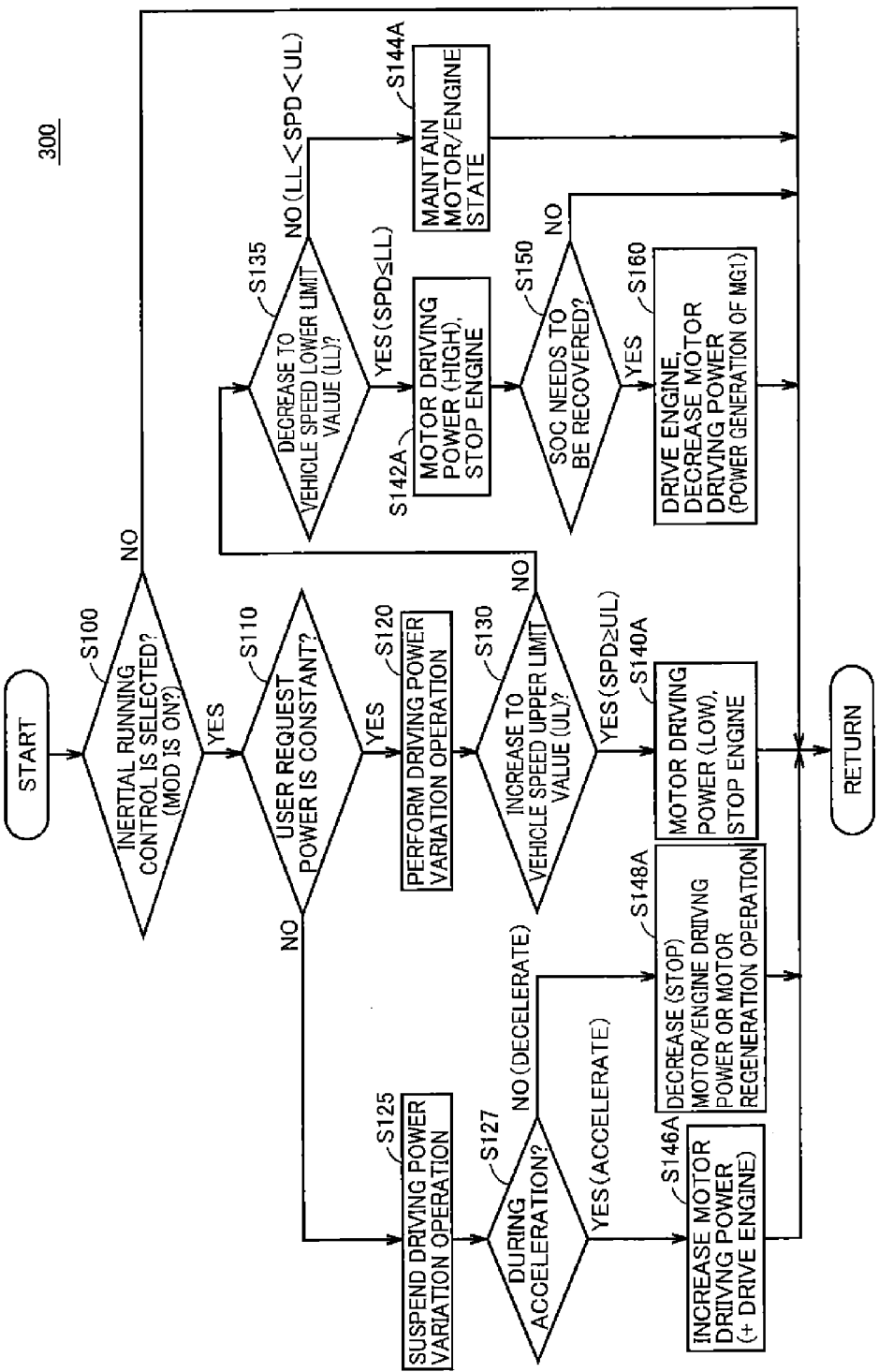
FIG. 10 is a flow chart illustrating a process of the inertial running control performed by an ECU in the example of FIG. 9.

Referring to FIGS. 9 and 10, a first example of the inertial running control in the third embodiment is described. In FIG. 9, in a manner similar to FIGS. 2 to 4 in the first embodiment, a horizontal axis represents time, and a vertical axis represents vehicle speed SPD, the output of the motor generator, request power from the user, charge and discharge power of the power storage device, and the SOC of the power storage device.

Referring to FIGS. 8 and 9, when the user indicates that the inertial running control should be performed at time t31, in a manner similar to the first embodiment, driving power variation operation of repeating inertial running in which the driving power of motor generator 130B (MG2) is in a low output state and acceleration running in which the driving power of MG2 is in a high output state is performed.

When the SOC decreases and falls below a prescribed threshold value and power storage device 110 needs to be charged, engine 160 is cranked and started by motor generator 130A (MG1) (time t34 in FIG. 9) prior to acceleration running by MG2.

Then, when vehicle speed SPD decreases to lower limit value LL of the acceptable range (time t35 in FIG. 9), acceleration running is performed with driving power from MG2 and engine 160 (between times t35 and t36 in FIG. 9). At this time, MG1 is driven by part of the driving power of engine 160, and power storage device 110 is charged with electric power generated by MG1 (solid lines W54 and W55 in FIG. 9).

Then, when vehicle speed SPD increases to upper limit value UL of the acceptable range, MG2 is switched to a low output state and engine 160 is stopped, and inertial running is performed again.

Between times t35 and t36 when both MG2 and engine 160 are driven, the driving power (output) generated by MG2 is set to be smaller than the driving power when engine 160 is not driven (PM5C<PM3C, PM7C). This is because the efficiency of engine 160 itself may indeed decline if engine 160 is driven with too low a load. Namely, engine 160 can be driven at an operating point of higher efficiency when outputting certain driving power. Then, the driving power generated by MG2 is accordingly reduced to decrease power consumption by MG2, thereby improving electric mileage.

Therefore, when acceleration running is performed only with the driving power from engine 160 and furthermore, power storage device 110 can be charged by MG1, the driving power generated by MG2 may be set to zero. Although charging of power storage device 110 by driving engine 160 is completed in single acceleration running in FIG. 9, if sufficient charging cannot be achieved in single acceleration running, engine 160 may be driven over a plurality of successive periods of acceleration running.

It is to be noted that the operation of switching between a first running pattern in which the driving power is stopped and a second running pattern in which the driving power is generated during the vehicle running, as with the engine in this first example of the third embodiment, is hereinafter also referred to as "interval operation."

FIG. 10 is a flow chart illustrating a process of the inertial running control performed by ECU 300 in the first example of the third embodiment. In FIG. 10, steps S140, S142, S144, S146 and S148 in FIG. 5 described in the first embodiment are replaced by S140A, S142A, S144A, S146A and S148A, respectively, and steps S150 and S160 are added. The descriptions of the steps in FIG. 10 the same as those in FIG. 5 will not be repeated.

Steps S150 and S160 added in FIG. 10 constitute a process used to charge power storage device 110 with the electric power generated by MG1.

Referring to FIGS. 8 and 10, S140A, S142A, S144A, S146A and S148A in FIG. 10 include driving conditions for engine 160 in addition to motor generator 130B (MG2) in S140, S142, S144, S146 and S148 in FIG. 5, respectively.

Specifically, if the user request power is constant (YES in S110) and the driving power variation operation is performed (S120), when vehicle speed SPD decreases to lower limit value LL (YES in S135), ECU 300 causes MG2 to be switched to a high output state, to perform acceleration running (S142A).

Then, when vehicle speed SPD increases to upper limit value UL (YES in S130), ECU 300 causes MG2 to be switched to a low output state, to perform inertial running (S140A).

In S140A and S142A, engine 160 is basically in a stopped state.

If acceleration running is selected in S142A, in S150, ECU 300 causes a determination to be made of whether or not the SOC has fallen below the prescribed threshold value and needs to be recovered by charging of power storage device 110.

If the SOC needs to be recovered (YES in S150), the process proceeds to S160 where ECU 300 causes engine 160 to be driven, and causes power storage device 110 to be charged with the electric power generated by MG1. ECU 300 also causes the driving power of MG2 to be decreased.

If the SOC does not need to be recovered (NO in S150), on the other hand, the processing of S160 is skipped, and ECU 300 causes engine 160 to be stopped and MG2 to be switched to a high output state, to perform acceleration running.

If the user request power varies (NO in S110) and the driving power variation operation is suspended (S125), when the vehicle is being accelerated (YES in S127), ECU 300 causes MG2 to be used, or both MG2 and engine 160 to be used, to accelerate the vehicle (S146A). When the vehicle is being decelerated (NO in S127), ECU 300 causes engine 160 to be stopped and MG2 to be switched to a low output state, to decelerate the vehicle (S148A). Alternatively, the vehicle may be decelerated by regeneration operation of MG2.

By performing the control in accordance with the process as described above, when the user request power is substantially constant in the hybrid vehicle including the engine and the motor generator, the driving power variation operation can be performed on the motor generator to improve energy efficiency during the vehicle running. Furthermore, when the SOC decreases, the SOC can be recovered by driving the engine and generating electric power using the motor generator during acceleration running of the driving power variation operation, while the driving power variation operation is continued.

Second Example of Third Embodiment

In the first example described with reference to FIGS. 9 and 10, engine 160 is driven together with MG2 only when power storage device 110 needs to be charged. In other words, except when power storage device 110 is charged, the so-called EV (Electric Vehicle) running is performed only with the driving power generated by MG2.

When the vehicle runs with constant request power in a relatively high output state, such as when driving on an expressway, however, driving power required for acceleration running in the inertial running control may not be obtained only by MG2.

Thus, in a second example described with reference FIGS. 11 and 12, engine 160 is driven by the interval operation during acceleration running in the inertial running control, also during a period other than when power storage device 110 needs to be charged.

Figure 11:
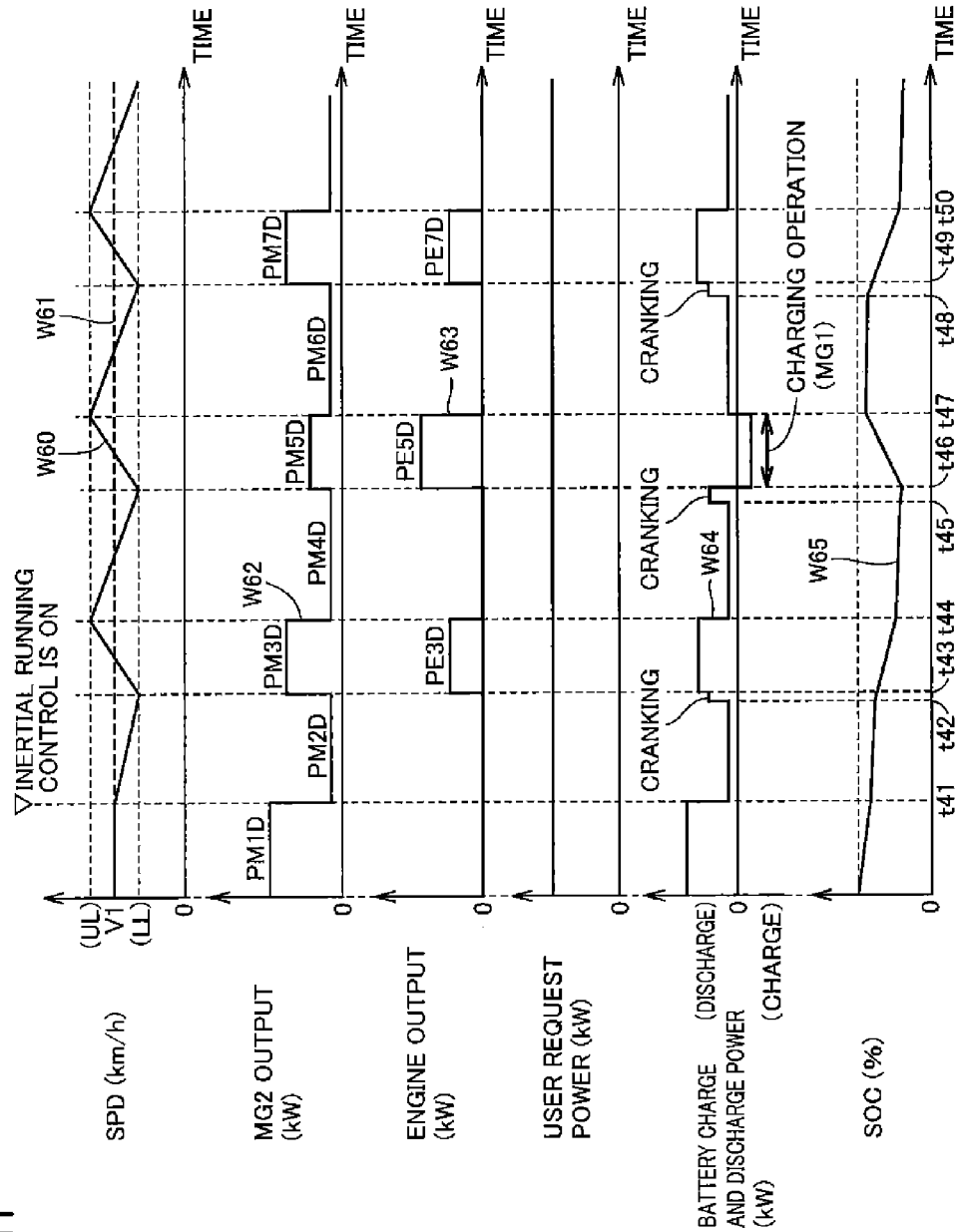
FIG. 11 is a time chart illustrating a second example of inertial running control in the third embodiment.

FIG. 11 is a time chart illustrating the second example of the inertial running control in the third embodiment. In FIG. 11 which is different from FIG. 9 of the above first example in driving pattern of engine 160, engine 160 is driven during a period when the SOC is recovered during acceleration running (between times t46 and t47 in FIG. 11), as well as during other periods when acceleration running is performed (between times t43 and t44, and t49 and t50 in FIG. 11). During the periods of acceleration running, vehicle 100 runs with driving power generated by both MG2 and engine 160.

Accordingly, engine 160 is cranked by MG1 immediately before the acceleration running is performed (times t42, t45 and t48 in FIG. 11).

In FIG. 11, when performing the acceleration running, the ratio of driving power allocated to MG2 and engine 160 is determined appropriately in consideration of the efficiency of MG2 and engine 160. Thus, depending on the efficiency of MG2 and engine 160, the driving power allocated to MG2 may be higher than the driving power allocated to engine 160, and vice versa.

Figure 12:
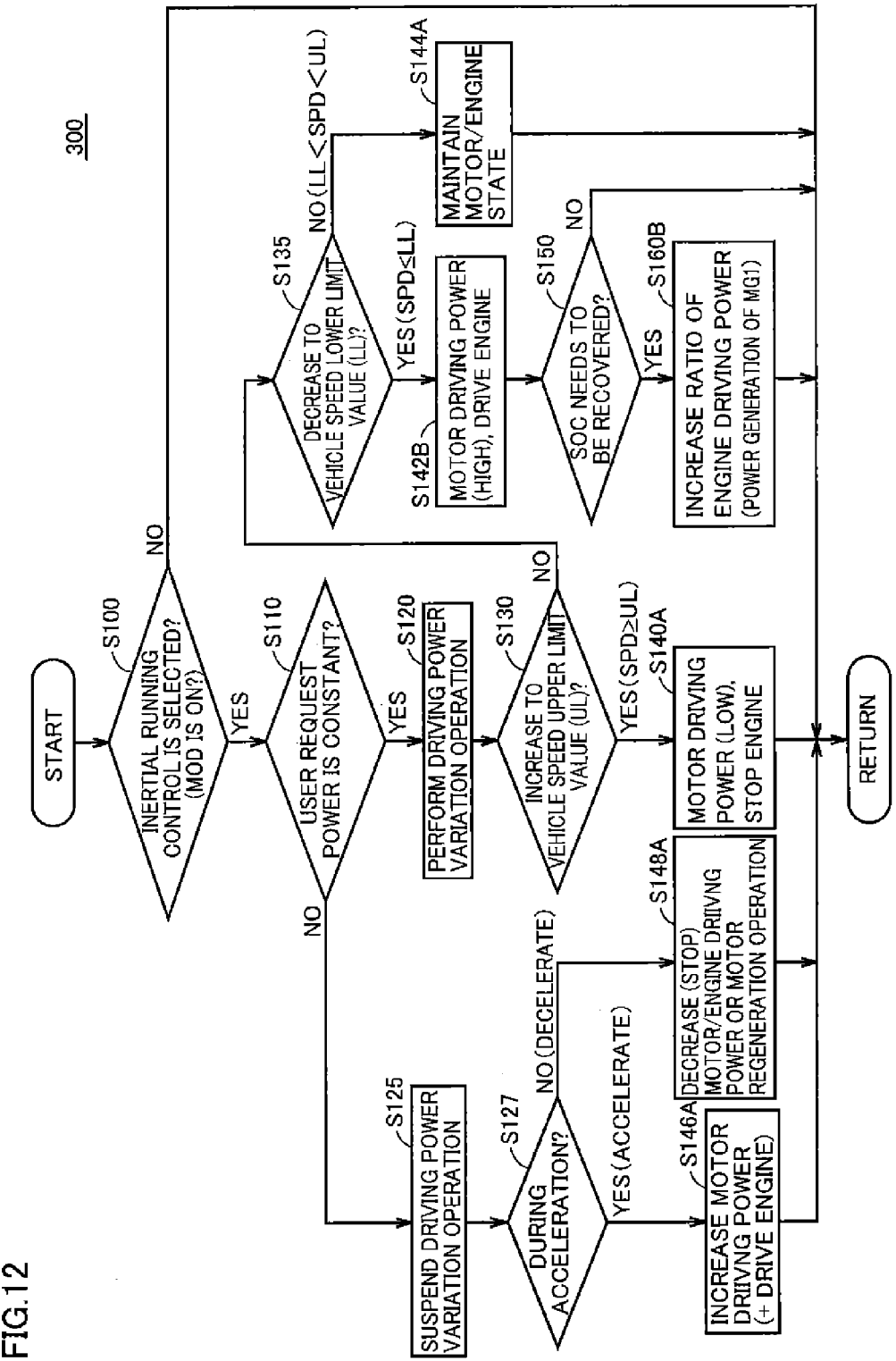
FIG. 12 is a flow chart illustrating a process of the inertial running control performed by an ECU in the example of FIG. 11.

FIG. 12 is a flow chart illustrating a process of the inertial running control performed by ECU 300 in the example of FIG. 11. In FIG. 12, steps S142A and S160 in the flow chart of FIG. 10 in the first example are replaced by S142B and S160B, respectively. The descriptions of the steps in FIG. 12 the same as those in FIG. 10 will not be repeated.

Referring to FIGS. 8 and 12, if the user request power is constant (YES in S110) and the driving power variation operation is performed (S120), when vehicle speed SPD decreases to lower limit value LL (YES in S135), ECU 300 causes MG2 to be switched to a high output state and engine 160 to be driven, to perform acceleration running (S142B).

Then, when vehicle speed SPD increases to upper limit value UL (YES in S130), ECU 300 causes engine 160 to be stopped and MG2 to be switched to a low output state, to perform inertial running (S140A).

If the SOC needs to be recovered when acceleration running is performed (YES in S150), the process proceeds to S160B where ECU 300 causes the ratio of the driving power generated by engine 160 in the required total driving power to be increased, in order to run the vehicle with the driving power from MG2 and engine 160 while generating electric power by driving MG1 by engine 160.

By performing the control in accordance with the process as described above, when the user request power is relatively large and substantially constant in the hybrid vehicle including the engine and the motor generator, the inertial running can be performed in which the driving power variation operation is conducted on the motor generator and the interval operation is conducted on the engine, to improve energy efficiency during the vehicle running while ensuring the required driving power. Furthermore, when the SOC decreases, the SOC can be recovered by increasing the driving power in the interval operation of the engine and generating electric power using the motor generator.

Although the timings of driving and stopping the motor generator and the engine are shown to be substantially simultaneous for the purpose of illustration in the first and second examples of the third embodiment described above, the timings of driving/stopping the motor generator and the engine do not need to be exactly simultaneous. That is, these timings can be set appropriately in consideration of the response and the like of the driving power of the motor generator and the engine. For example, the timings of driving/stopping the motor generator having a relatively high response may be used as a reference, to correspondingly delay or advance the timings of driving/stopping the engine.

Fourth Embodiment

In the third embodiment, the inertial running control was described in which the driving power variation control is performed on the motor generator and the interval operation is performed on the engine in the hybrid vehicle including the motor generator and the engine.

In this case, however, as was described with reference to FIGS. 9 and 11, starting operation is performed on the engine whenever driving power from the engine is required. As was described in the second embodiment, a loss may occur at the starting operation if the engine is started and stopped repeatedly. Moreover, it takes time before the start of self-sustained operation of the engine, which may result in difficulty in generating the driving power with a quick response.

When the engine is driven, furthermore, exhaust gas needs to be purified by a catalyst. The catalyst cannot appropriately purify the exhaust gas when having a temperature lower than an activation temperature, however. If the engine is operated intermittently as in the interval operation, therefore, the temperature of the catalyst may not be able to increase sufficiently to the activation temperature, thus deteriorating a state of emissions.

Thus, in the fourth embodiment, in the hybrid vehicle including the motor generator and the engine shown in FIG. 8, the inertial running is performed in which the driving power variation operation is conducted on the engine while the engine is maintained in a driven state, and the interval operation is conducted on the motor generator, in a manner opposite to the third embodiment.

First Example of Fourth Embodiment

Figure 13:
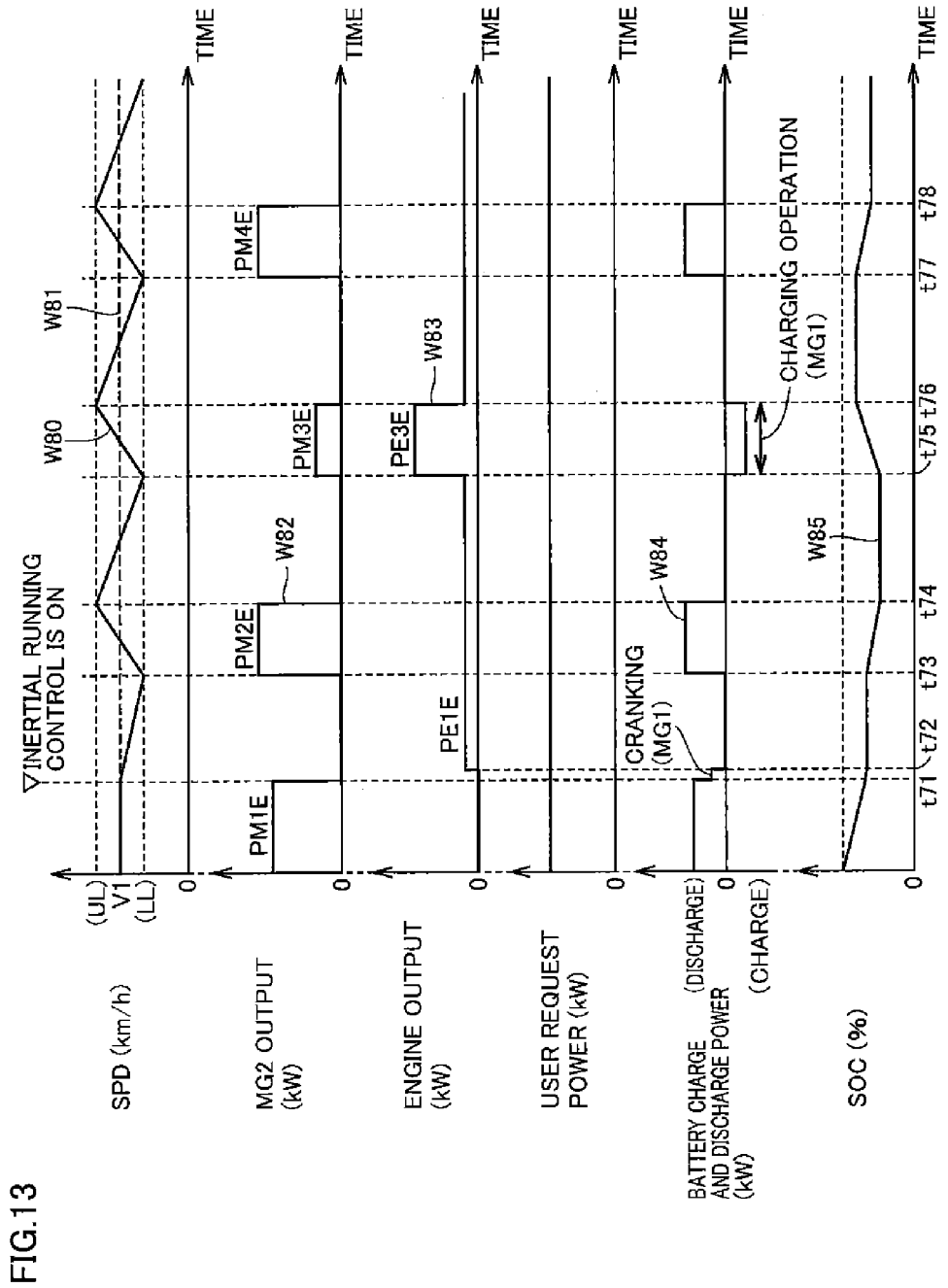
FIG. 13 is a time chart illustrating a first example of inertial running control in a fourth embodiment.
Figure 14:
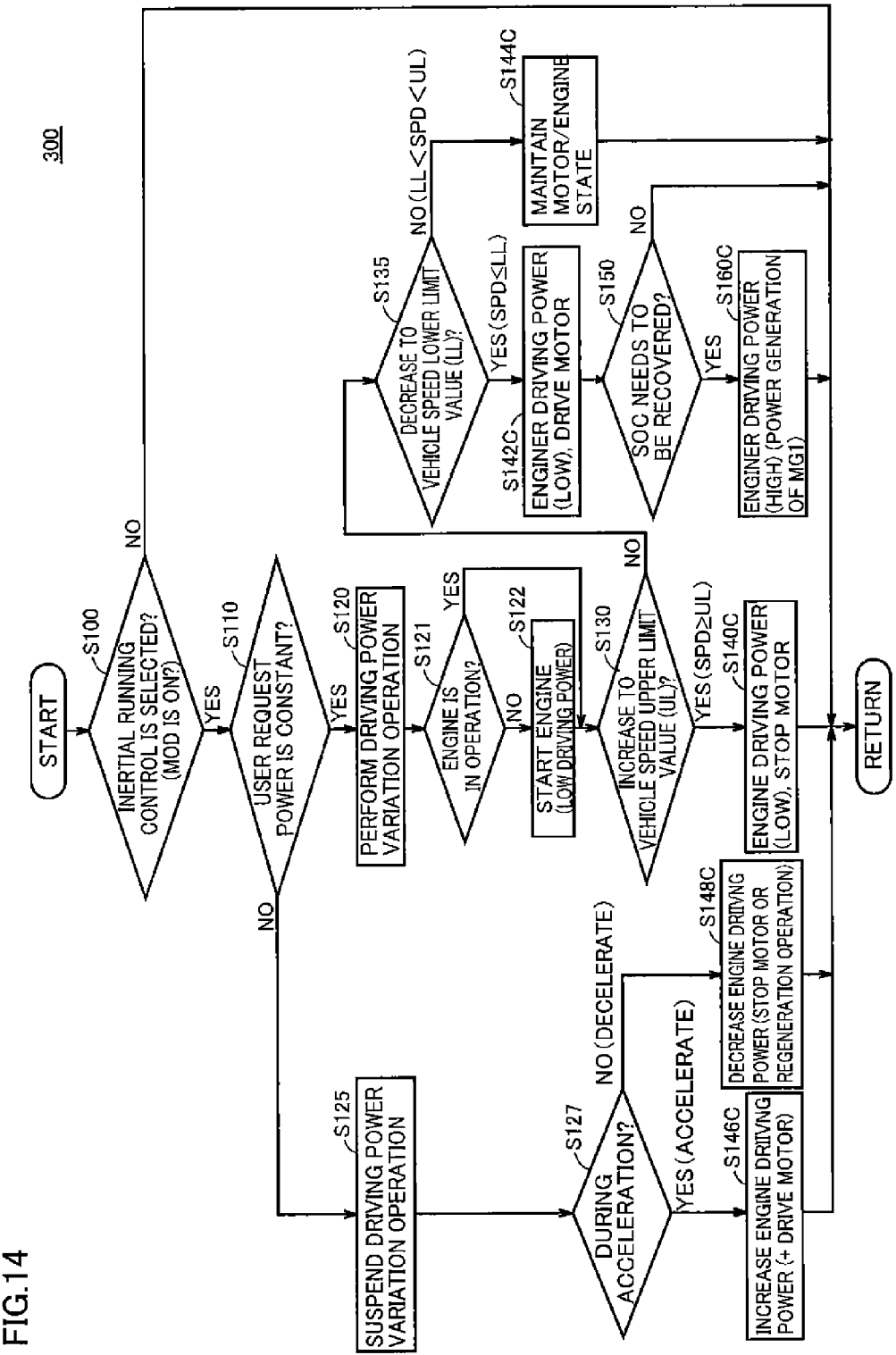
FIG. 14 is a flow chart illustrating a process of the inertial running control performed by an ECU in the example of FIG. 13.

Referring to FIGS. 13 and 14, a first example of the inertial running control in the fourth embodiment is described. FIG. 13 is a time chart illustrating the first example of the inertial running control in the fourth embodiment.

Referring to FIGS. 8 and 13, when the inertial running control is selected at time t71, motor generator 130B (MG2) performs the interval operation of switching between a running pattern in which the generation of the driving power is stopped and coasting running is performed and a finning pattern in which the vehicle is accelerated with the driving power.

When the inertial running control is selected at time t71, engine 160 is cranked and subjected to a starting operation by motor generator 130A (MG1). Engine 160 is then operated, when self-sustained operation is started, in a low output state (PE1E) such as an idle state.

When the SOC of power storage device 110 falls below the prescribed threshold value, during a subsequent period of acceleration running, the driving power of engine 160 is put in a high output state, and MG1 is driven to charge power storage device 110 (between times t75 and t76 in FIG. 13). Then, when the SOC is recovered to the prescribed level, the driving power of the engine is switched to a low output state.

In a manner similar to the third embodiment, the driving power generated by MG2 during the period of acceleration running when engine 160 is switched to a high output state is set to be smaller than the driving power during the period of acceleration running when engine 160 is in a low output state.

When engine 160 is in a low output state, the output from engine 160 may be transmitted to drive wheel 150, or may not be transmitted by an engagement device such as a clutch (not shown).

FIG. 14 is a flow chart illustrating a process of the inertial running control performed by ECU 300 in the example of FIG. 13. In FIG. 14, steps S140A, S142A, S144A, S146A, S148A and S160 in the flow chart of FIG. 10 described in the thirteenth embodiment are replaced by S140C, S142C, S144C, S146C, S148C and S160C, respectively, and steps S121 and S122 are added. The descriptions of the steps in FIG. 14 the same as those in FIG. 10 will not be repeated.

Referring to FIGS. 8 and 14, if the user request power is constant (YES in S110) and the driving power variation operation is performed (S120), ECU 300 causes MG2 to be stopped to perform inertial running as in FIG. 13, although not shown in FIG. 14. Then, in S121, ECU 300 causes a determination to be made of whether or not engine 160 is already in operation.

If engine 160 is not in operation (NO in S121), in S122, ECU 300 causes engine 160 to be started. At this time, engine 160 is initially operated in a low output state of low driving power after the self-sustained operation is established. The process then proceeds to S130.

If engine 160 is already in operation (YES in S121), on the other hand, the processing of S122 is skipped, and ECU 300 causes the process to proceed to S130.

Then, until vehicle speed SPD decreases to lower limit value LL of the acceptable range (NO in S130 and NO in S135), in S144C, ECU 300 causes the operation states of MG2 and engine 160 to be maintained. That is, ECU 300 causes MG2 to be maintained in a stopped state and engine 160 to be maintained in a low output state.

When vehicle speed SPD decreases to lower limit value LL of the acceptable range (YES in S135), in S142C, ECU 300 causes MG2 to be driven to perform acceleration running. At this time, ECU 300 causes engine 160 to be maintained in a low output state.

If it is determined in S150 that the SOC has fallen below the prescribed threshold value and needs to be recovered (YES in S150), the process proceeds to S160C where ECU 300 causes the driving power of engine 160 to be switched to a high output state to drive MG1, and causes power storage device 110 to be charged with the electric power generated by MG1. If the SOC does not need to be recovered (NO in S150), ECU 300 causes the operation state in S142C to be continued.

When vehicle speed SPD increases to upper limit value UL of the acceptable range by the acceleration running (YES in S130), on the other hand, the process proceeds to S140C where ECU 300 causes engine 160 to be driven in a low output state and MG2 to be stopped. If MG1 is being driven during the acceleration running, ECU 300 causes MG1 to be stopped as well in S140C.

If the user request power varies (NO in S110) and the driving power variation operation is suspended (S125), when the vehicle is being accelerated (YES in S127), ECU 300 causes MG2 to be used, or both MG2 and engine 160 to be used, to accelerate the vehicle (S146C). When the vehicle is being decelerated (NO in S127), ECU 300 causes the driving power of engine 160 to be decreased, and causes MG2 to be stopped or causes MG2 to perform regeneration operation, to decelerate the vehicle (S148C).

By performing the control in accordance with the process as described above, when the user request power is substantially constant in the hybrid vehicle including the engine and the motor generator, the interval operation can be performed on the motor generator and the driving power variation operation can be performed on the engine, to reduce a loss at the start of the engine and improve energy efficiency during the vehicle running. Furthermore, when the SOC decreases, the SOC can be recovered by increasing the driving power of the engine and generating electric power using the motor generator during the acceleration running.

Second Example of Fourth Embodiment

In a second example of the fourth embodiment, engine 160 is driven in a high output state during acceleration running in the inertial running control, also during a period other than when power storage device 110 needs to be charged. This applies to an example where the driving power generated by the engine is required in addition to the driving power generated by the motor generator in order to attain the user request power, such as when driving on an expressway, as was described in the second example of the third embodiment.

Figure 15:
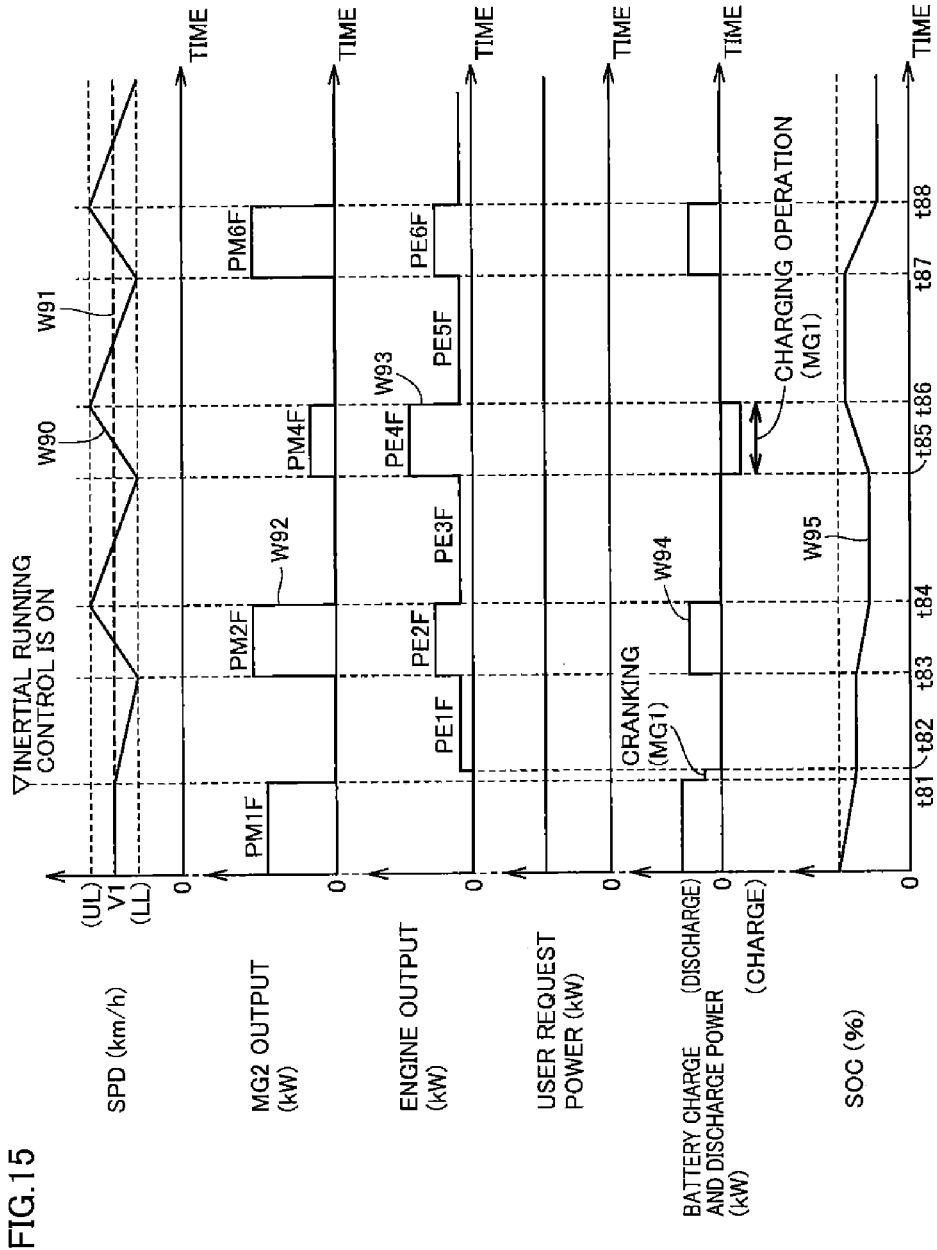
FIG. 15 is a time chart illustrating a second example of inertial running control in the fourth embodiment.

FIG. 15 is a time chart illustrating the second example of the inertial running control in the fourth embodiment. In FIG. 15 which is different from FIG. 13 of the above first example in driving pattern of engine 160, engine 160 is driven during a period when the SOC is recovered during acceleration running (between times t85 and t86 in FIG. 15), as well as during other periods when acceleration running is performed (between times t83 and t84, and t87 and t88 in FIG. 15). During the periods of acceleration running, vehicle 100 runs with driving power generated by both MG2 and engine 160.

In FIG. 15, when performing the acceleration running, the ratio of driving power allocated to MG2 and engine 160 is determined appropriately in consideration of the efficiency of MG2 and engine 160.

Figure 16:
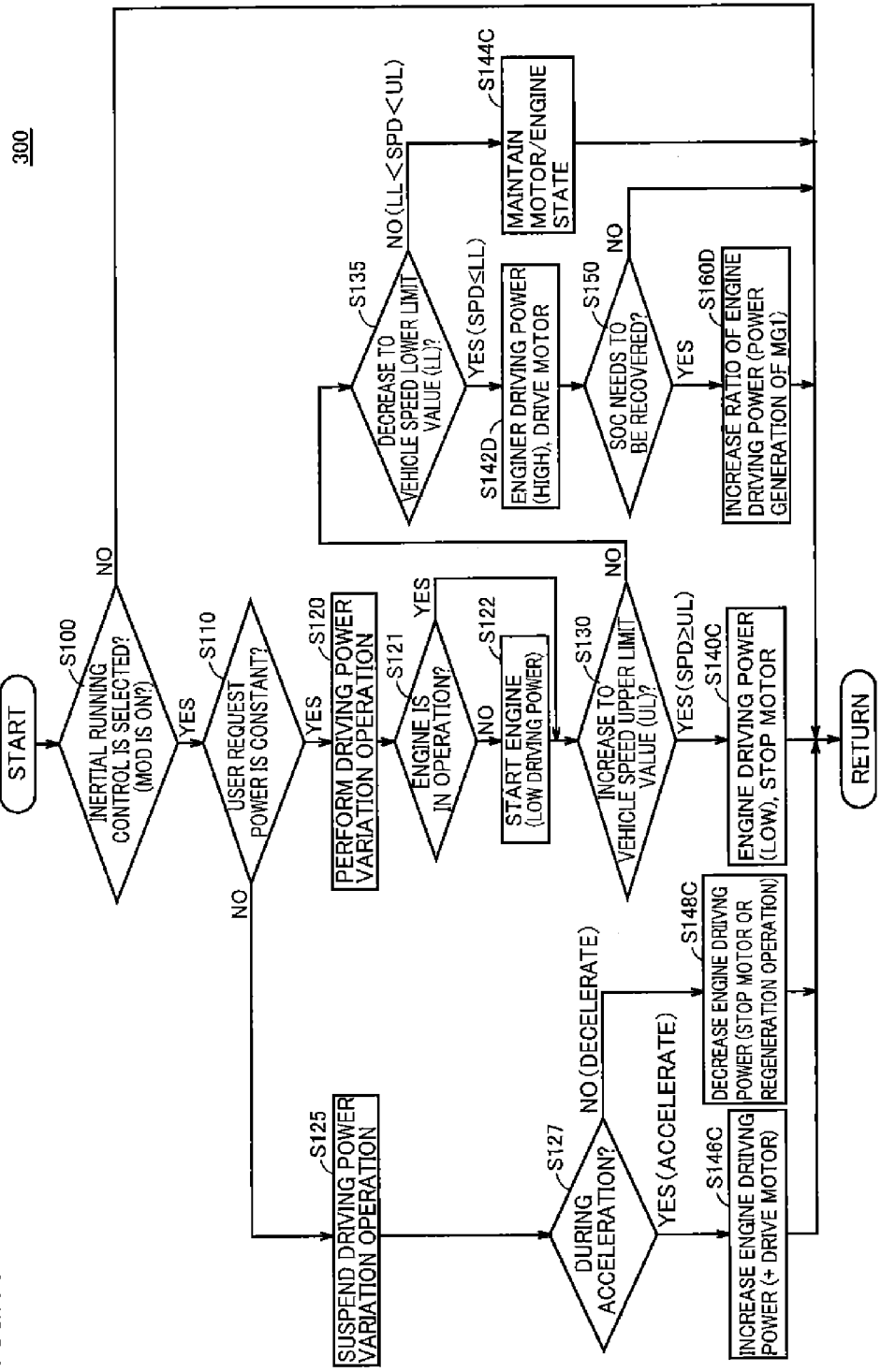
FIG. 16 is a flow chart illustrating a process of the inertial running control performed by an ECU in the example of FIG. 15.

FIG. 16 is a flow chart illustrating a process of the inertial running control performed by ECU 300 in the example of FIG. 15. In FIG. 16, steps S142C and S160C in the flow chart of FIG. 14 in the first example are replaced by S142D and S160D, respectively. The descriptions of the steps in FIG. 16 the same as those in FIG. 14 will not be repeated.

Referring to FIGS. 8 and 16, if the user request power is constant (YES in S110) and the driving power variation operation is performed (S120), ECU 300 causes MG2 to be stopped to perform acceleration running, and causes engine 160 to be started (S122).

Then, until vehicle speed SPD decreases to lower limit value LL of the acceptable range (NO in S130 and NO in S135), in S144C, ECU 300 causes the operation states of MG2 and engine 160 to be maintained. That is, ECU 300 causes MG2 to be maintained in a stopped state and engine 160 to be maintained in a low output state.

When vehicle speed SPD decreases to lower limit value LL of the acceptable range (NO in S135), in S142D, ECU 300 causes MG2 to be driven and engine 160 to be switched to a high output state, to perform acceleration running with driving power from MG2 and engine 160.

If it is determined in S150 that the SOC has fallen below the prescribed threshold value and needs to be recovered (YES in S150), the process proceeds to S160D where ECU 300 causes the ratio of the driving power generated by engine 160 in the required total driving power to be increased, in order to run the vehicle with the driving power from MG2 and engine 160 while generating electric power by driving MG1 by engine 160. If the SOC does not need to be recovered (NO in S150), ECU 300 causes the operation state in S142D to be continued.

When vehicle speed SPD increases to upper limit value UL of the acceptable range by the acceleration running (YES in S130), on the other hand, the process proceeds to S140C where ECU 300 causes engine 160 to be driven in a low output state and MG2 to be stopped. If MG1 is being driven during the acceleration running, ECU 300 causes MG1 to be stopped as well in S140C.

By performing the control in accordance with the process as described above, when the user request power is relatively large and substantially constant in the hybrid vehicle including the engine and the motor generator, the inertial running can be performed in which the interval operation is conducted on the motor generator and the driving power variation operation is conducted on the engine, to improve energy efficiency during the vehicle running while ensuring the required driving power. Furthermore, when the SOC decreases, the SOC can be recovered by increasing the driving power of the engine and generating electric power using the motor generator.

Fifth Embodiment

In the third and fourth embodiments above, the hybrid vehicle including the engine and the motor generator as a plurality of driving sources was described by way of example. The present invention is also applicable to vehicles having other configurations, such as an electric vehicle having a twin motor configuration capable of running with driving power from two motor generators as a plurality of driving sources, as shown in FIG. 17, for example.

Figure 17:
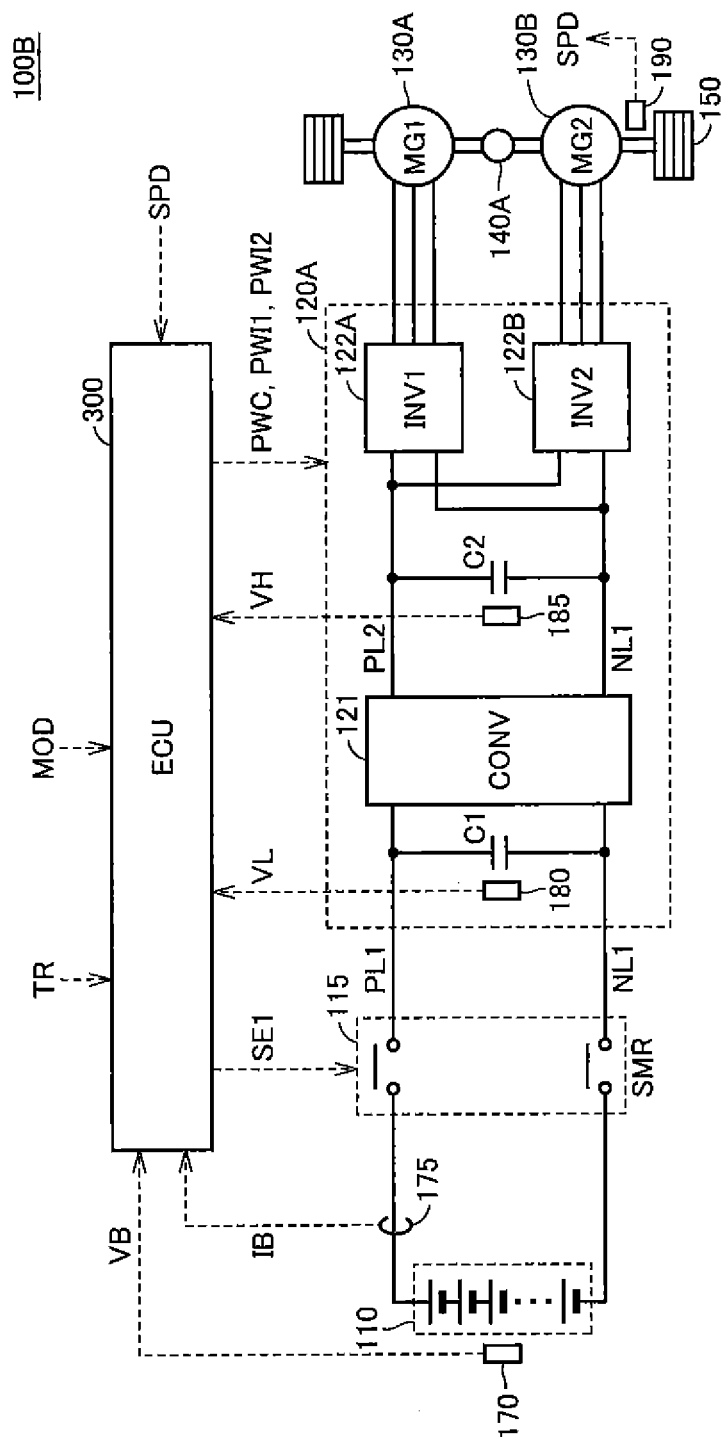
FIG. 17 is an overall block diagram of a vehicle according to a fifth embodiment where two motor generators are provided as driving sources.

A vehicle 100B in FIG. 17 has the configuration of vehicle 100A in FIG. 8 which is not provided with engine 160. Vehicle 100B runs with driving power from both motor generator 130A (MG1) and motor generator 130B (MG2).

In this case, although power storage device 100 cannot be charged as in the third and fourth embodiments, the driving power variation operation can be performed by replacing the driving power of engine 160 with an output of MG1 in FIG. 9 and the like in the third embodiment.

The present invention is also applicable to an example where MG1 is used as a motor rather than as a generator and the vehicle runs with driving power generated by three driving sources of MG1, MG2 and engine 160, in the configuration of FIG. 8.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100, 100A, 100B vehicle; 110 power storage device; 115 SMR; 120 PCU; 121 converter; 122, 122A, 122B inverter; 130, 130A, 130B motor generator; 140, 140A power transmission gear; 150 drive wheel; 160 engine; 170, 180, 185 voltage sensor; 175 current sensor; 190 speed sensor; 300 ECU; C1, C2 capacitor; PL1, PL2, NL1 power line.

The invention claimed is:
1. A vehicle comprising:
first and second driving sources generating driving power for running the vehicle; and
a control device for controlling the first and second driving sources,
the control device causing inertial running control to be performed,
by causing driving power variation operation to be performed on the driving source in which the first driving source is switched between a first state where the first driving source generates driving power of a prescribed level and a second state where the first driving source generates driving power larger than the driving power in the first state to run the vehicle, and
by causing interval operation to be performed on the second driving source in which the second driving source is switched between a first running pattern where the generation of the driving power by the second driving source is stopped and a second run- ning pattern where the driving power generated by the second driving source is used for running to run the vehicle.

2. The vehicle according to claim 1, wherein the control device causes the inertial running control to be performed, when driving power requested by a user varies within a prescribed range.

3. The vehicle according to claim 2, wherein the control device causes switching between the states of the first driving source and the running patterns of the second driving source so as to maintain a speed of the vehicle within an acceptable range, while the inertial running control is performed.

4. The vehicle according to claim 3, wherein the control device causes switching to the first state in response to an increase in the speed of the vehicle to an upper limit of the acceptable range, and causes switching to the second state in response to a decrease in the speed of the vehicle to a lower limit of the acceptable range.

5. The vehicle according to claim 1, wherein the driving power in the first state is set to be smaller than reference driving power of constant output capable of maintaining a speed of the vehicle, and the driving power in the second state is set to be larger than the reference driving power.

6. The vehicle according to claim 5, wherein the vehicle runs mainly with inertial force of the vehicle in the first state.

7. The vehicle according to claim 1, wherein the first driving source is a rotating electric machine, and the second driving source is an engine.

8. The vehicle according to claim 7, wherein the control device causes, when the rotating electric machine is switched to the second state while the engine is in the second running pattern, the driving power generated by the rotating electric machine to be smaller than the driving power when the rotating electric machine is switched to the second state while the engine is in the first running pattern.

9. The vehicle according to claim 7, wherein the control device causes the engine to be switched to the second running pattern during a period when the rotating electric machine is in the second state.

10. The vehicle according to claim 7, further comprising:
a power storage device supplying electric power to the rotating electric machine; and
a generator configured to be driven by the engine to generate electric power for charging the power storage device, wherein
the control device causes the engine to be switched to the second running pattern when the generator is driven to charge the power storage device.

11. The vehicle according to claim 7, further comprising:
a power storage device supplying electric power to the rotating electric machine; and
a generator configured to be driven by the engine to generate electric power for charging the power storage device, wherein
the control device causes the generator to be driven to charge the power storage device when the engine is in the second running pattern, and
the control device causes, when the engine is in the second running pattern, the driving power of the engine when generating electric power by the generator to be larger than the driving power of the engine when not generating electric power by the generator.

12. The vehicle according to claim 1, wherein the first driving source is an engine, and the second driving source is a rotating electric machine.

13. The vehicle according to claim 12, wherein the control device causes, when the rotating electric machine is switched to the second running pattern while the engine is in the second state, the driving power generated by the rotating electric machine to be smaller than the driving power when the rotating electric machine is switched to the second running pattern while the engine is in the first state.

14. The vehicle according to claim 12, wherein the control device causes the rotating electric machine to be switched to the second running pattern during a period when the engine is in the second state.

15. The vehicle according to claim 12, further comprising:
a power storage device supplying electric power to the rotating electric machine; and
a generator configured to be driven by the engine to generate electric power for charging the power storage device, wherein
the control device causes the engine to be switched to the second state when the generator is driven to charge the power storage device.

16. The vehicle according to claim 12, further comprising:
a power storage device supplying electric power to the rotating electric machine; and
a generator configured to be driven by the engine to generate electric power for charging the power storage device, wherein
the control device causes the generator to be driven to charge the power storage device when the engine is in the second state, and
the control device causes, when the engine is in the second state, the driving power of the engine when generating electric power by the generator to be larger than the driving power of the engine when not generating electric power by the generator.

17. The vehicle according to claim 1, wherein the first and second driving sources are a first rotating electric machine and a second rotating electric machine, respectively.

18. A method of controlling a vehicle including first and second driving sources generating driving power for running, comprising the steps of:
putting the first driving source in a first state where the first driving source generates driving power of a prescribed level;
putting the first driving source in a second state where the first driving source generates driving power larger than the driving power in the first state;
performing driving power variation operation of switching between the first and second states to run the vehicle;
putting the second driving, source in a first running pattern where the generation of the driving power by the second driving source is stopped;
putting the second driving source in a second running pattern where the driving power generated by the second driving source is used for running; and
performing interval operation of switching between the first and second running patterns to run the vehicle.

* * * * *